United States Patent
Sasaki et al.

(10) Patent No.: US 9,594,534 B2
(45) Date of Patent: Mar. 14, 2017

(54) INFORMATION PROCESSING APPARATUS, INFORMATION PROCESSING METHOD, AND STORAGE MEDIUM THAT PERFORM IMAGE PROCESSING FOR A DOWNLOADED IMAGE BASED ON THIRD PARTY SUBJECTIVE EVALUATION INFORMATION

(71) Applicant: CANON KABUSHIKI KAISHA, Tokyo (JP)

(72) Inventors: Takeru Sasaki, Kawasaki (JP); Takashi Nakamura, Yokohama (JP); Kiyoshi Umeda, Kawasaki (JP); Hiroyasu Kunieda, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/829,679

(22) Filed: Aug. 19, 2015

(65) Prior Publication Data

US 2016/0062716 A1  Mar. 3, 2016

(30) Foreign Application Priority Data

Aug. 27, 2014 (JP) .................................. 2014-173009

(51) Int. Cl.
*G06F 3/12* (2006.01)
*H04N 1/00* (2006.01)

(52) U.S. Cl.
CPC .......... *G06F 3/1287* (2013.01); *G06F 3/1204* (2013.01); *G06F 3/1243* (2013.01); *H04N 1/00145* (2013.01); *H04N 1/00167* (2013.01); *H04N 1/00196* (2013.01); *H04N 1/00244* (2013.01); *H04N 1/00456* (2013.01);
(Continued)

(58) Field of Classification Search
None
See application file for complete search history.

(56) References Cited

U.S. PATENT DOCUMENTS

| 4,667,228 A | 5/1987 | Kawamura et al. |
| 5,287,439 A | 2/1994 | Koga et al. |
| 5,539,476 A | 7/1996 | Sasaki |

(Continued)

FOREIGN PATENT DOCUMENTS

| JP | 2003-134323 A | 5/2003 |
| JP | 2003-219329 A | 7/2003 |

(Continued)

*Primary Examiner* — Thomas D Lee
(74) *Attorney, Agent, or Firm* — Fitzpatrick, Cella, Harper & Scinto

(57) ABSTRACT

An information processing apparatus includes a download unit to download, in accordance with an instruction of a user, a print target image from a server accessible by a third party using an SNS (Social Networking Service) via a network, different from the user. A processor obtains subjective evaluation information of the third party for the print target image included in a tag added to the print target image downloaded by the download unit, evaluates the print target image, based on the subjective evaluation information of the third party, and performs image processing for the downloaded print target image in accordance with a result of the evaluation. An output unit outputs image data that has undergone the image processing of the processor.

13 Claims, 19 Drawing Sheets

(52) U.S. Cl.
CPC ............... *H04N 2201/0013* (2013.01); *H04N 2201/0082* (2013.01); *H04N 2201/0096* (2013.01)

(56) References Cited

U.S. PATENT DOCUMENTS

| | | |
|---|---|---|
| 5,673,067 A | 9/1997 | Ogawa et al. |
| 5,677,725 A | 10/1997 | Honbo et al. |
| 6,100,929 A | 8/2000 | Ikeda et al. |
| 6,438,566 B1 | 8/2002 | Okuno et al. |
| 7,978,909 B2 | 7/2011 | Umeda |
| 7,983,528 B2 | 7/2011 | Sohma et al. |
| 8,045,795 B2 | 10/2011 | Umeda |
| 8,600,154 B2 | 12/2013 | Umeda et al. |
| 8,675,249 B2 | 3/2014 | Umeda et al. |
| 8,718,359 B2 | 5/2014 | Sakai et al. |
| 8,929,681 B2 | 1/2015 | Umeda et al. |
| 9,036,205 B2 | 5/2015 | Umeda et al. |
| 9,118,876 B2 * | 8/2015 | Felt .................... A45D 44/005 |
| 9,135,523 B2 | 9/2015 | Kato et al. |
| 2003/0142954 A1 | 7/2003 | Kotani et al. |
| 2005/0129331 A1 * | 6/2005 | Kakiuchi ............... G06T 7/408 382/275 |
| 2014/0010415 A1 | 1/2014 | Kunieda et al. |
| 2014/0010450 A1 | 1/2014 | Suwa et al. |
| 2014/0010451 A1 | 1/2014 | Sumi et al. |
| 2014/0013213 A1 | 1/2014 | Kajiwara et al. |
| 2014/0016152 A1 * | 1/2014 | Onitsuka .................. H04N 1/21 358/1.13 |
| 2014/0185932 A1 | 7/2014 | Sakai et al. |
| 2015/0355799 A1 * | 12/2015 | Yamagishi ............. G06T 11/60 715/730 |

FOREIGN PATENT DOCUMENTS

| | | |
|---|---|---|
| JP | 2005-217859 A | 8/2005 |
| JP | 2006-120076 A | 5/2006 |
| JP | 2006-350557 A | 12/2006 |
| JP | 2010-020594 A | 1/2010 |
| JP | 2010-251999 A | 11/2010 |

* cited by examiner

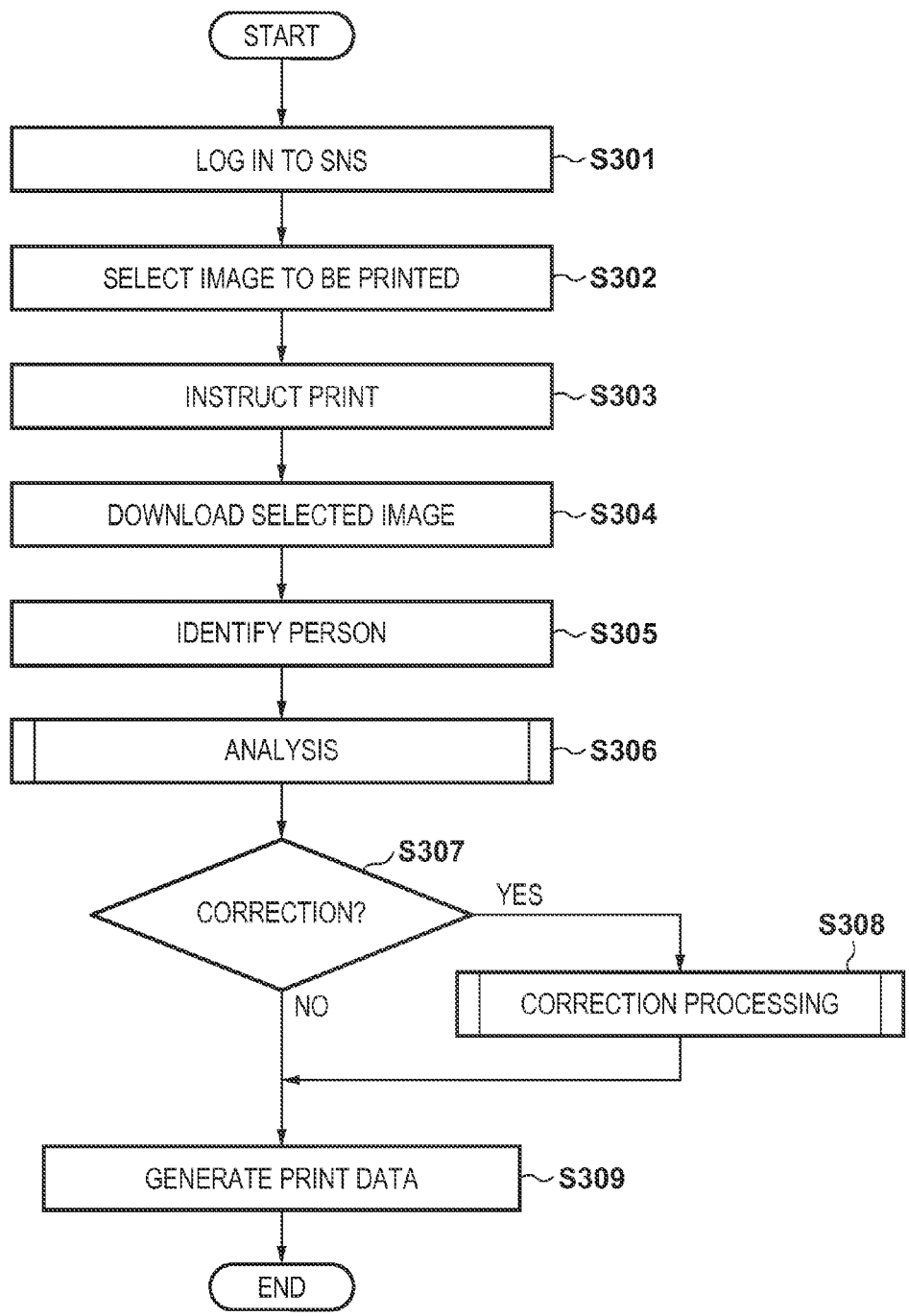

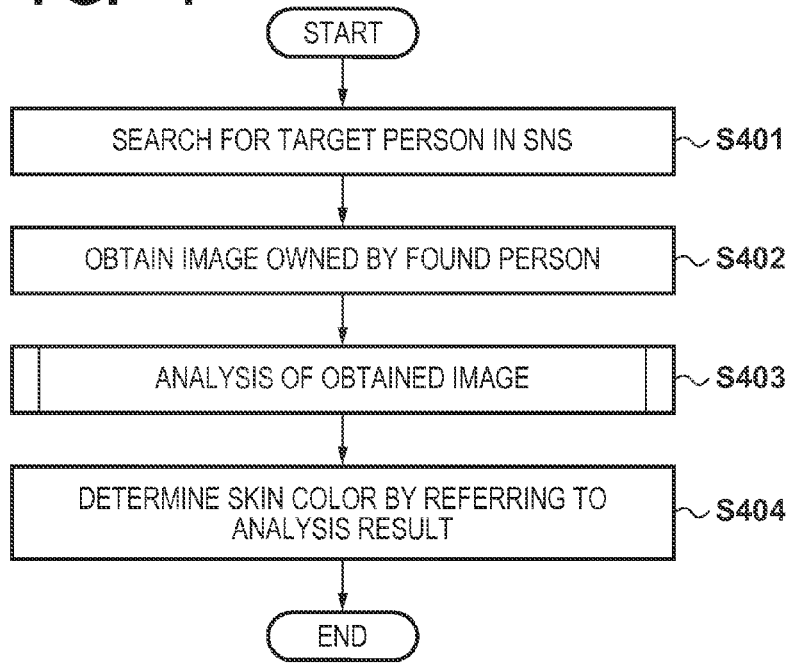
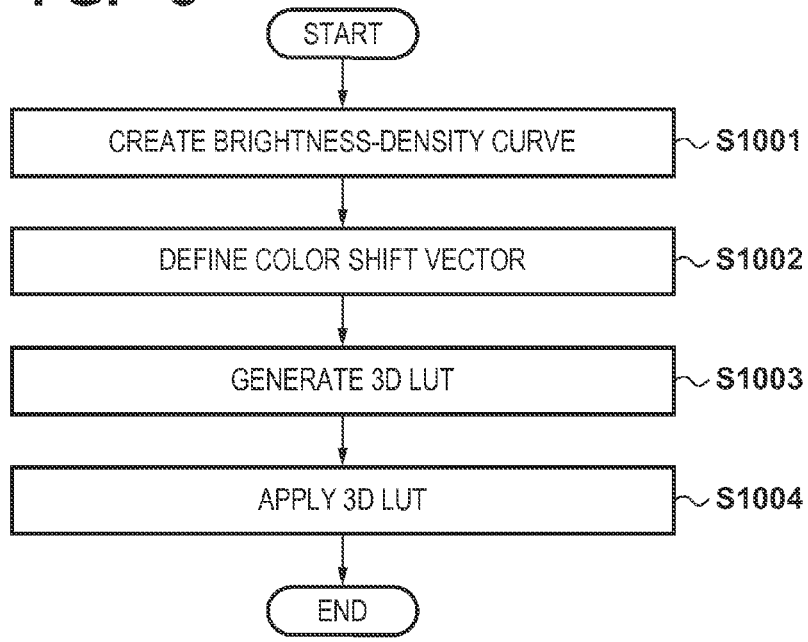

F I G. 19

|        | IMAGE a | IMAGE b | IMAGE c | IMAGE d | IMAGE e | IMAGE f |
|--------|---------|---------|---------|---------|---------|---------|
| USER A | ○ | ○ | — | — | — | — |
| USER B | — | — | ○ | ○ | — | — |
| USER C | ○ | — | — | — | ○ | — |
| USER D | ○ | — | — | — | ○ | — |
| USER E | ○ | — | — | — | ○ | — |
| USER F | — | — | — | — | ○ | ○ |
| USER G | — | — | — | — | ○ | ○ |
| USER H | — | — | ○ | — | ○ | ○ |
| USER I | — | — | ○ | — | — | ○ |
| USER J | — | — | ○ | — | — | ○ |
| TOTAL  | 4 | 1 | 4 | 1 | 6 | 5 |

|  | RELATIONSHIP WITH A | RELATIONSHIP WITH B |
|---|---|---|
| USER A | USER HIMSELF/HERSELF | STRANGER |
| USER B | STRANGER | USER HIMSELF/HERSELF |
| USER C | FRIEND | STRANGER |
| USER D | FRIEND | STRANGER |
| USER E | FRIEND | STRANGER |
| USER F | FRIEND | FRIEND |
| USER G | FRIEND | FRIEND |
| USER H | FRIEND | FRIEND |
| USER I | STRANGER | FRIEND |
| USER J | STRANGER | FRIEND |

FIG. 21

| | EXECUTER | BASIC POINT | | |
|---|---|---|---|---|
| | | USER HIMSELF/HERSELF | FRIEND | STRANGER |
| Case1 | A | 1 | 0 | 0 |
| | B | 1 | 0 | 0 |
| Case2 | A | 1 | 1 | 1 |
| | B | 1 | 1 | 1 |
| Case3 | A | 3 | 1 | 1 |
| | B | 3 | 1 | 1 |
| Case4 | A | 3 | 1.5 | 1 |
| | B | 4 | 2.4 | 1 |

FIG. 22

| | EXECUTER | TOTAL SCORE | | | | | | OUTPUT RESULT |
|---|---|---|---|---|---|---|---|---|
| | | IMAGE a | IMAGE b | IMAGE c | IMAGE d | IMAGE e | IMAGE f | |
| Case1 | A | 0 | 1 | 0 | 0 | 0 | 0 | a, b |
| | B | 0 | 0 | 1 | 1 | 0 | 0 | c, d |
| Case2 | A | 4 | 1 | 4 | 1 | 6 | 5 | e, f |
| | B | 4 | 1 | 4 | 1 | 6 | 5 | e, f |
| Case3 | A | 6 | 3 | 4 | 1 | 6 | 5 | a, e |
| | B | 4 | 1 | 6 | 3 | 6 | 5 | c, e |
| Case4 | A | 7.5 | 3 | 4.5 | 1 | 9 | 6.5 | a, e |
| | B | 4 | 1 | 11.2 | 4 | 10.2 | 12 | c, f |

INFORMATION PROCESSING APPARATUS, INFORMATION PROCESSING METHOD, AND STORAGE MEDIUM THAT PERFORM IMAGE PROCESSING FOR A DOWNLOADED IMAGE BASED ON THIRD PARTY SUBJECTIVE EVALUATION INFORMATION

CLAIM OF PRIORITY

This application claims the benefit of Japanese Patent Application No. 2014-173009, filed Aug. 27, 2014, which is hereby incorporated by reference herein in its entirety.

BACKGROUND OF THE INVENTION

Field of the Invention

The present invention relates to an information processing apparatus, an information processing method, and a storage medium, and, particularly, to an information processing apparatus, an information processing method, and a storage medium for performing image processing for an image downloaded from a server accessible by a third party.

Description of the Related Art

Along with proliferation of digital cameras and smartphones, a new day has come where everyone can easily enjoy photography. When printing a digital image shot by a digital device using a printer, image processing is sometimes performed to attain a fine-looking print product. For example, if overexposure/underexposure has occurred upon shooting a digital image, it is desirable to perform appropriate image processing to compensate for this. If the eyes of a target person are in a so-called red eye state because of electronic flash upon shooting, correction is desirably performed. If a human face is included in a digital image, it is desirable to perform appropriate image processing to attain a good-looking skin color in a print product. In addition, these image processes are desirably automatically executed, because manually performing them one by one consumes much time and effort.

Generally, when automatically executing image processing, it is necessary to analyze an image or to evaluate the attribute of an image from so-called Exif tag information associated with the image data so as to perform processing suitable for the image. By the analysis and evaluation, image processing appropriate for the image is determined.

Analyzing attribute information associated with an image or image data will be referred to as image comprehension in the following description. In Japanese Patent Laid-Open No. 2010-251999, image comprehension is performed via analysis of an input image. The feature amount of the image is obtained from the result of image comprehension. Scene determination and reliability calculation of the scene are performed based on the obtained feature amount, thereby automatically executing correction processing. In this way, the result of image comprehension is mainly used to generate, to obtain, and to evaluate a feature amount.

However, image comprehension by image data itself is limited. In the method disclosed in Japanese Patent Laid-Open No. 2010-251999, a determination error may occur depending on an input image. For example, if a night scene image is erroneously determined as underexposure, the night scene image is corrected to be bright. Reversely, if an image of underexposure is erroneously determined to be a night scene image, a portion that should be corrected to be bright is not corrected as expected. As another example, assume that an image includes a person, and appropriate color balance correction needs to be performed for the person's skin color. In this case, it may be difficult to estimate the appropriate skin color of the target person based on only information obtained from the image.

When automatically performing image processing, the same problems as described above may arise, even in automatic layout generation processing. An evaluation value used to determine a layout generation condition is obtained using the analysis result of a target photo. As a result, layout generation is performed based on a feature amount that expresses image quality of an image file itself. However, it may be difficult to determine a desirable image from a feature amount obtained from image comprehension. For example, it is difficult to automatically select a desirable image that is blurred to some extent, but expressive. In addition, enormous works are necessary for one user to manually input evaluation of an image.

SUMMARY OF THE INVENTION

Accordingly, the present invention is conceived as a response to the above-described disadvantages of the conventional art.

For example, an information processing apparatus, an information processing method, and a storage medium according to this invention are capable of more suitably performing image comprehension from automatic image processing.

According to one aspect, the present invention provides an information processing apparatus comprising a download unit configured to download, in accordance with an instruction of a user, an image from a server accessible by a third party different from the user, an obtaining unit configured to obtain evaluation information of the third party for the image downloaded by the download unit, an image processing unit configured to perform image processing for the downloaded image in accordance with the evaluation information obtained by the obtaining unit, and an output unit configured to output image data that has undergone the image processing of the image processing unit.

The invention is particularly advantageous, since it is possible to more suitably perform image comprehension from automatic image processing by obtaining, from a third party on a network, evaluation information of an image that is information hard to obtain from the image itself.

Further features of the present invention will become apparent from the following description of exemplary embodiments (with reference to the attached drawings).

BRIEF DESCRIPTION OF THE DRAWINGS

FIG. 3 is a flowchart showing the outline of print data generation processing according to the first embodiment.

FIG. 4 is a flowchart showing details of analysis processing.

FIG. 5 is a flowchart showing an example of correction processing of making YCbCr values close to Y0Cb0Cr0 values.

FIG. 19 is a view showing a list representing which user has added "like" to which image.

FIG. 21 is a view showing a table of basic points in four cases (Cases 1 to 4).

FIG. 22 is a view showing a table of total scores in four cases (Cases 1 to 4) shown in FIG. 21.

DESCRIPTION OF THE EMBODIMENTS

Exemplary embodiments of the present invention will now be described in detail in accordance with the accompanying drawings. It should be noted that the relative arrangement of the constituent elements, and the like, set forth in the embodiments do not limit the scope of the present invention, unless it is specifically stated otherwise.

In this specification, the terms "print" and "printing" not only include the formation of significant information such as characters and graphics, but also broadly include the formation of images, figures, patterns, and the like, on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Several embodiments to generate print data using information obtained from an SNS (Social Networking Service) will now be described.

<Description of Hardware Arrangement (FIG. 1)>

Figure 1:
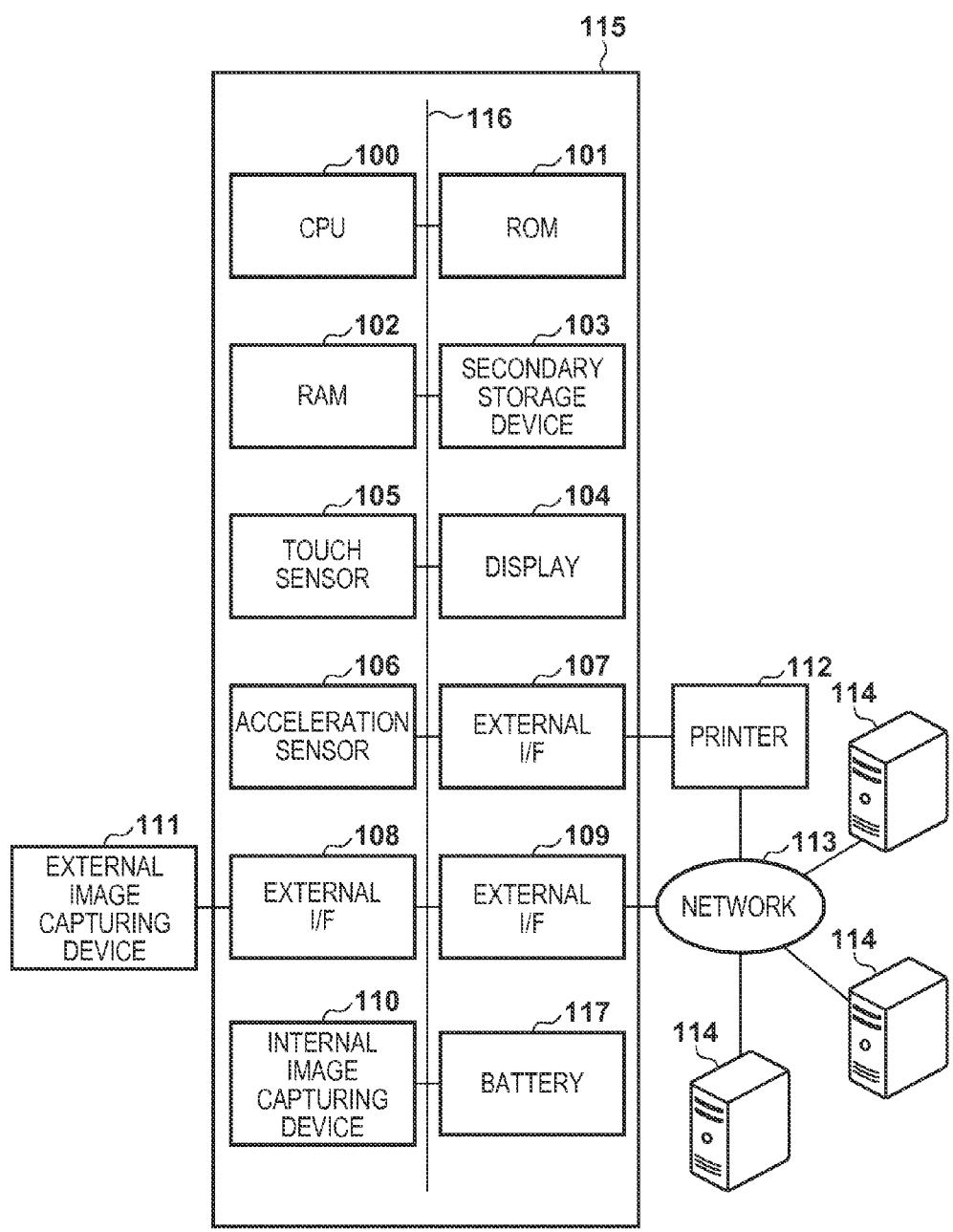
FIG. 1 is a block diagram for explaining an example of the arrangement of an information processing apparatus according to an embodiment of the present invention.

FIG. 1 is a block diagram for explaining an example of the arrangement of, for example, a portable information terminal such as a smartphone or mobile telephone as an information processing apparatus 115 according to an embodiment of the present invention. Referring to FIG. 1, a CPU (central processing unit/processor) 100 executes various kinds of processing to be described below in accordance with programs. The CPU 100 shown in FIG. 1 includes one CPU, but may be formed from a plurality of CPUs or CPU cores. A ROM 101 stores programs to be executed by the CPU 100. A RAM 102 is a memory used to temporarily store various kinds of information when the CPU 100 executes a program.

A secondary storage device 103, such as a hard disk or flash memory, is a storage device configured to store data of databases that hold files or processing results of image analysis, and the like, and various kinds of programs. A display 104 displays a UI (User Interface) to accept operations for implementing various kinds of processing or various kinds of information such as a result of executed processing. The display 104 may include a touch sensor 105.

The information processing apparatus 115 may include an internal image capturing device 110. Image data obtained by image capturing of the internal image capturing device 110 undergoes predetermined image processing and is then saved in the secondary storage device 103. Image data can also be loaded from an external image capturing device 111 connected via an external I/F (interface) 108.

The information processing apparatus 115 includes an external I/F (interface) 109 and can perform communication via a network 113 such as the Internet. The information processing apparatus 115 can obtain, via the communication I/F 109, image data or information associated with an SNS from a server 114 connected to the network 113.

The information processing apparatus 115 includes an acceleration sensor 106 and can obtain acceleration information concerning the position and orientation of the information processing apparatus 115 itself. The information processing apparatus 115 is connected to a printer 112 via an external I/F 107 and can output data such as image data. The printer 112 is also connected to the network 113 and can transmit/receive image data via the communication I/F 109.

Each of the external I/Fs 107 to 109 is an interface having at least one communication form out of wired communication and wireless communication, and communicates with an external device (printer 112 or server 114) in accordance with the communication form in use. Examples of wired communication are USB and Ethernet®, and examples of wireless communication are wireless LAN, NFC, Bluetooth®, and infrared communication. When the wireless LAN is used for wireless communication, apparatuses are connected to each other directly or via a relay apparatus such as a wireless LAN router. Although the external I/Fs 107 to 109 are separately configured in FIG. 1, they may be integrated.

Power necessary for the operation of the information processing apparatus 115 is supplied from a battery 117. Various constituent elements of the information processing apparatus 115 are connected to each other via a control bus/data bus 116. The CPU 100 controls the various constituent elements via the control bus/data bus 116.

Note that, in this embodiment, the information processing apparatus 115 serves as the place (software execution environment) to execute software such as the programs executed by the control unit (CPU 100) provided in the information processing apparatus 115.

The example of the information processing apparatus shown in FIG. 1 is hardware assumed to be a portable mobile computer. However, the present invention is not limited to this. For example, the same arrangement can be implemented on the hardware of a desktop or laptop personal computer. In this case, a pointing device or keyboard may be provided as a UI in place of the touch sensor 105 that is provided on the display 104 of the portable mobile computer to form a UI.

<Description of Software Configuration (FIG. 2)>

In the information processing apparatus 115, an operating system (OS) that controls the entire apparatus and many applications are installed and operate. Only software associated with printing an image by the printer 112 in cooperation with an SNS will be described here.

Figure 2:
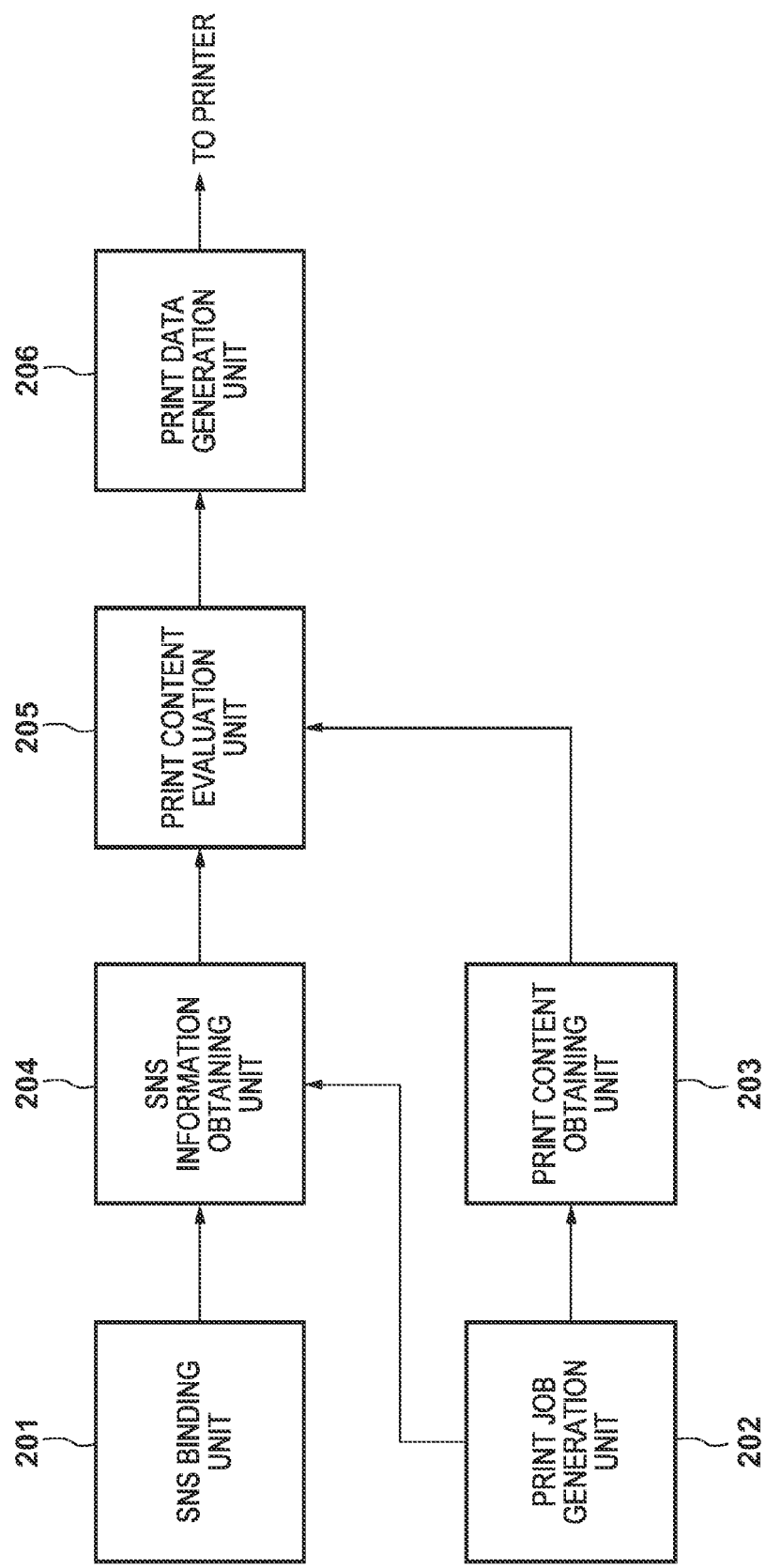
FIG. 2 is a block diagram showing a software configuration that operates in the information processing apparatus shown in FIG. 1.

FIG. 2 is a block diagram showing a software configuration that operates in the information processing apparatus 115. Note that program modules corresponding to blocks to be described with reference to FIG. 2 are stored in the ROM 101, and the CPU 100 executes the program modules on the RAM 102, thereby implementing the functions of the blocks.

An SNS binding unit 201 binds a user and an SNS. A print job generation unit 202 generates a print job. The print job is information about a print instruction. The print job includes all pieces of information generated upon printing, such as a print target image, paper, quality, copies, layout, and color/monochrome setting. The print target image may include a plurality of images. The print job is generated upon receiving a user instruction. The print job may be generated by a proposal application that automatically proposes printing.

A print content obtaining unit 203 obtains print content data based on the print job. The print content data is saved in the secondary storage device 103 or the server 114. Based on the print job, an SNS information obtaining unit 204 obtains information other than the print content data from an SNS server that is one of the servers 114.

An SNS will be described here. At present, an SNS here is assumed to be a system to share and to receive/send information accessible on the Internet. An SNS often has functions of managing access and user information, grouping users, and allowing users to evaluate each other. At any rate, an environment that allows a plurality of registered users to send out information to each other and to simultaneously share information will be defined as an SNS.

Information (to be referred to as SNS information hereafter) managed by the SNS will be described next. An example of SNS information is personal profile information such as the name, sex, age, birthday, educational background, business career, birthplace, and place of residence of a user. Information about a user's activity on the SNS, for example, write information about a user's occasional impression or current history, content information such as an image or music posted by a user, or event information created by a user is also an example of SNS information. Information about a user's friend, information posted by the user's friend on the SNS, and the like, are also included in the SNS information.

The SNS information obtaining unit 204 can obtain the various kinds of information using an application interface (API) prepared by the SNS in advance. In this embodiment, a case where tag information added to a print target image is obtained will be described. A poster or browser can add a tag to an image posted on the SNS to indicate who is a person in the image.

The tag information includes information such as the personal ID and name of the target person on the SNS and coordinates representing a tag position in the image. If the poster of the photo solely adds tags, his/her works are enormous. On the SNS, however, the tagging can be done by the poster and his/her friends (third parties). In some cases, the tagging is also performed for images other than the photo posted by the poster.

Hence, photo data on the SNS has much more pieces of correct information representing where the poster exists than in a case when the user solely performs the tagging.

A print content evaluation unit 205 evaluates print target image data using SNS information. In this embodiment, based on the tag information obtained by the SNS information obtaining unit 204, the print content evaluation unit 205 recognizes what kind of person is included in the print target image as the object. Then, the print content evaluation unit 205 evaluates the face color of the target person using a method to be described later. A print data generation unit 206 generates print data based on the evaluation result of the print content evaluation unit 205.

In this embodiment, the print data generation unit 206 corrects the face color of the target person based on face color evaluation of the target person in the print content by the print content evaluation unit 205. The generated print data is transferred to the printer 112, thereby obtaining a print product.

Several embodiments of print processing of an image shot in cooperation with the SNS using the information processing apparatus having the above-described arrangement and software installed in the information processing apparatus will be described next.

First Embodiment

FIGS. 3 to 6

Processing of, when correcting any desired image, obtaining an appropriate skin color of a person included in the image and appropriately correcting the skin color will be described here.

FIG. 3 is a flowchart showing the outline of print data generation processing according to the first embodiment. Note that the processing shown in the flowchart of FIG. 3 is implemented by causing a CPU 100 to execute the program modules of blocks shown in FIG. 2. A description will be made below assuming that the process of each step of the flowchart is executed by the CPU 100 itself or each block caused to function by the CPU 100. This also applies to FIGS. 7, 12, 14, 15 17, and 18 to be described later.

In step S301, when the user logs in to an SNS, an SNS binding unit 201 binds the user and the SNS. The SNS binding unit 201 displays a screen on a display 104 for the user to input an SNS-ID and password to log in. The user inputs the SNS-ID and the SNS password via a touch sensor 105 or the display 104. The SNS binding unit 201 connects an information processing apparatus 115 to a network 113 via an external I/F 109. The SNS binding unit 201 accesses an SNS server that is one of servers 114, and performs authentication using the SNS-ID and SNS password input by the user.

In step S302, the user selects a print target image from images posted on the SNS. In step S303, a print instruction of the selected image is input. A print job generation unit 202 displays, on the display 104, images on the SNS server, and accepts selection of a print target image by the user. The print job generation unit 202 accepts an instruction of the print target image, paper, quality, copies, layout, and color/monochrome setting, and generates a print job based on the print instruction.

In step S304, the print content obtaining unit 203 obtains print target image data based on the print job generated in step S303. A case when the user instructs to print an image posted on the SNS will be examined. The print content obtaining unit 203 accesses the SNS server, downloads the print target image data, and temporarily saves it in a RAM 102.

In step S305, processing of identifying a target person included in the image data obtained in step S304 is executed. To do this, an SNS information obtaining unit 204 obtains tag information added to the print target image from the SNS server via the external I/F 109 and the network 113. The tag information includes information such as the personal ID and name of the target person in the image and coordinates representing a tag position in the image. Based on the tag information, a print content evaluation unit 205 can identify who is included at which position in the print target image data.

In step S306, analysis processing of the face color of the target person is executed.

The analysis processing will be described with reference to the flowchart of FIG. 4.

FIG. 4 is a flowchart showing details of analysis processing.

In step S401, the SNS information obtaining unit 204 accesses the SNS server using the personal ID information of the target person identified in step S305. A check using the personal ID is performed by the SNS, and a search is made for the target person. In step S402, the SNS information obtaining unit 204 obtains images owned by the found target person and tag information added to the images. In step S403, the print content evaluation unit 205 analyzes images including the target person from the obtained images and tag information.

Note that, concerning the processes of steps S401 to S403, if there exists an API that obtains images associated with the target person and tag information added to the images directly from the SNS, it may be used.

In step S404, based on the analysis result of each image obtained in step S403, the print content evaluation unit 205 estimates the original face color of the person included in the image downloaded in step S304. The necessity of this processing will be explained. In skin color perception, a human makes a decision by viewing light of a light source reflected on the skin. Hence, the face color changes depending on whether the light source is the sun or a fluorescent lamp. Hence, image comprehension of the image is not enough to determine whether the face color of the person included in the image downloaded in step S304 is desirable. In step S403, many images including the person and obtained in step S402 are analyzed, thereby checking the appropriate skin color of the target person. In step S404, since the skin color of the person in the image other than the print target image is referred to, an appropriate skin color is determined at a high possibility.

As described above, tagging of person positions is done on the SNS, not by a known personal recognition algorithm, but by much labor including third parties. In personal identification by the known personal recognition algorithm, a recognition error occurs at a probability of several tens of percentages. In particular, it is sometimes difficult to reliably identify, by an existing algorithm, persons such as siblings or a parent and a child who are alike in face. On the other hand, since the above-described tagging is done manually, correct tag information can be obtained at a high possibility as compared to recognition by an algorithm. Here, since the correct tag information as described above is used, the appropriate skin color of the person of interest can be determined more correctly.

To check the appropriate skin color, for example, the average Y0Cb0Cr0 values of many face regions obtained using tag information may be calculated, or the average value of hues may be used. Alternatively, the median value of brightness values may be obtained, or the mode value of brightness values may be used.

Referring back to FIG. 3, in step S307, the face color (average YCbCr values) of the target person in the print target image obtained in step S302 is compared with the face color (Y0Cb0Cr0 values) estimated in step S306, and it is determined whether correction is necessary. That is, it is determined whether the YCbCr values are similar to the Y0Cb0Cr0 values. In a case when it is determined that the values are not similar, it is determined that correction is necessary. Whether the values are similar is determined by, for example, performing comparison for each of the Y, Cb, and Cr color components. If at least one of the differences exceeds a predetermined threshold, it can be determined that the values are not similar. In a case when it is determined that correction is necessary, the process advances to step S308 to execute correction processing. As an example of the correction processing, a method of reflecting the brightness difference between the estimated face color and the face color of the target person in the print target image data on the entire print target image data is usable.

An example of correction processing will be described here with reference to FIGS. 5 and 6.

FIG. 5 is a flowchart showing an example of correction processing of making YCbCr values close to Y0Cb0Cr0 values. FIG. 6 is a graph showing an example of a brightness-density curve.

Figure 6:
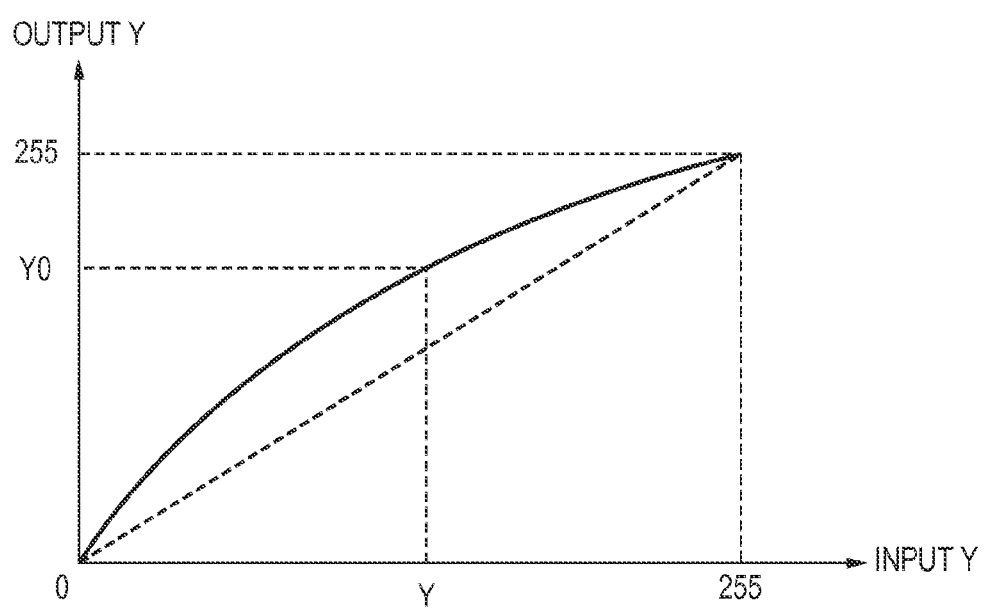
FIG. 6 is a graph showing an example of a brightness-density curve.

In step S1001, a brightness-density curve as shown in FIG. 6, which converts Y into Y0, is set in a YCbCr space. In step S1002, a color shift vector (Cbv, Crv)=(Cb0−Cb, Cr0−Cr), which converts CbCr into Cb0Cr0, is defined.

In step S1003, a 3D LUT in an RGB space, which uses the brightness-density curve and the color shift vector, is generated. The 3D LUT generation method is known, and a specific example will briefly be described. First, RGB values in each grid are temporarily converted into YCbCr values. Next, the brightness-density curve shown in FIG. 6 is applied to the Y component, and the above-described color shift vector is added to each of the CbCr values, thereby calculating Y'Cb'Cr' values. The Y'Cb'Cr' values are converted into the coordinate system of the RGB space, thereby obtaining R'G'B' values.

In step S1004, the thus generated 3D LUT is applied to each pixel of the image using a known interpolation method, thereby obtaining corrected image data.

An example of correction processing has been described above. However, the present invention is not limited to this method, and any method is usable as long as it can make calculated YCbCr values of skin color close to estimated Y0Cb0Cr0 values. In addition, correction need not always be performed for the entire image, and only a region corresponding to the person in the image may be corrected.

Referring back to FIG. 3 again, in step S309, the print target image data itself that is determined in step S307 not to need correction or the image data corrected in step S308 is transferred to the print data generation unit 206 to generate print data.

Hence, according to the above-described embodiment, image data downloaded based on information obtained from the SNS is analyzed. If necessary, image data that has undergone correction processing to correctly express the appropriate skin color of the person of interest based on the analysis result can be used in printing.

Note that, in the above embodiment, tag information on the SNS is used in personal identification of the print target image. However, the present invention is not limited to this. For example, personal identification of the print target image may be performed using a known personal recognition algorithm. Based on information obtained as a result of identification, an average face color value may be calculated using tag information on the SNS.

Additionally, in the above embodiment, the skin color of the person included in the print target photo image is estimated. However, the present invention is not limited to this. For example, when performing printing for the first time, information of the estimated skin color of a person included in an image of interest may be saved in a database together with the ID (for example, name) of the person. When printing another image next, correction processing may be performed using the skin color value read out from the database. This can speed up the processing.

Second Embodiment

FIGS. 7 to 11

In the first embodiment, an example has been described in which tag information of the person in the print target image is obtained from the SNS, the face color of the person is evaluated/analyzed, and the image is corrected. In this example, information is obtained from the SNS, the print target image is evaluated, and print data is generated. However, the present invention is not limited to this. An example in which an automatic layout is generated using an electric photo group called an album posted on the SNS will be described here. In particular, an example will be described in which pieces of support information and comment information of third parties associated with the photo group are obtained from the SNS, the photo group is evaluated using the pieces of information, and an automatic layout is generated.

For example, it is possible to analyze an image and to determine the priority order of a layout image based on adequacy of brightness and contrast of the entire image, adequacy of brightness and sharpness of a detected human face, or subjective image evaluation made by a specific user himself/herself. In some cases, however, even an image that is not necessarily evaluated highly in image analysis, for example, a photo including a face that is blurred to some extent, but expressive, is suitable for printing. In addition, works to do tagging based on subjective evaluation are enormous, and it may be difficult to do subjective evaluation for many images by one user. Hence, the above-described method may be unable to appropriately evaluate an image if there are many images as print target candidates.

Considering the above problem, this embodiment employs the following arrangement.

As processing necessary for a user to upload images using an SNS, there are processing of causing the user to log in to the SNS and processing of uploading images to an event. The images uploaded by the user are displayed on the news feed of a third party (for example, family, distant relative, or friend without blood relation). The third party views the images, and presses a "like" button or adds a comment to an image with a funny expression, a unique image, or a beautiful image, or shares a fine photo on his/her news feed. The greater the number of friends of the user on the SNS is, the greater the number of obtained information is, consequently.

Normal information exchange between users has been described above.

Next, assume that the user wants to automatically create, from a photo group of a certain event, an album layout using a predetermined application.

Figure 7:
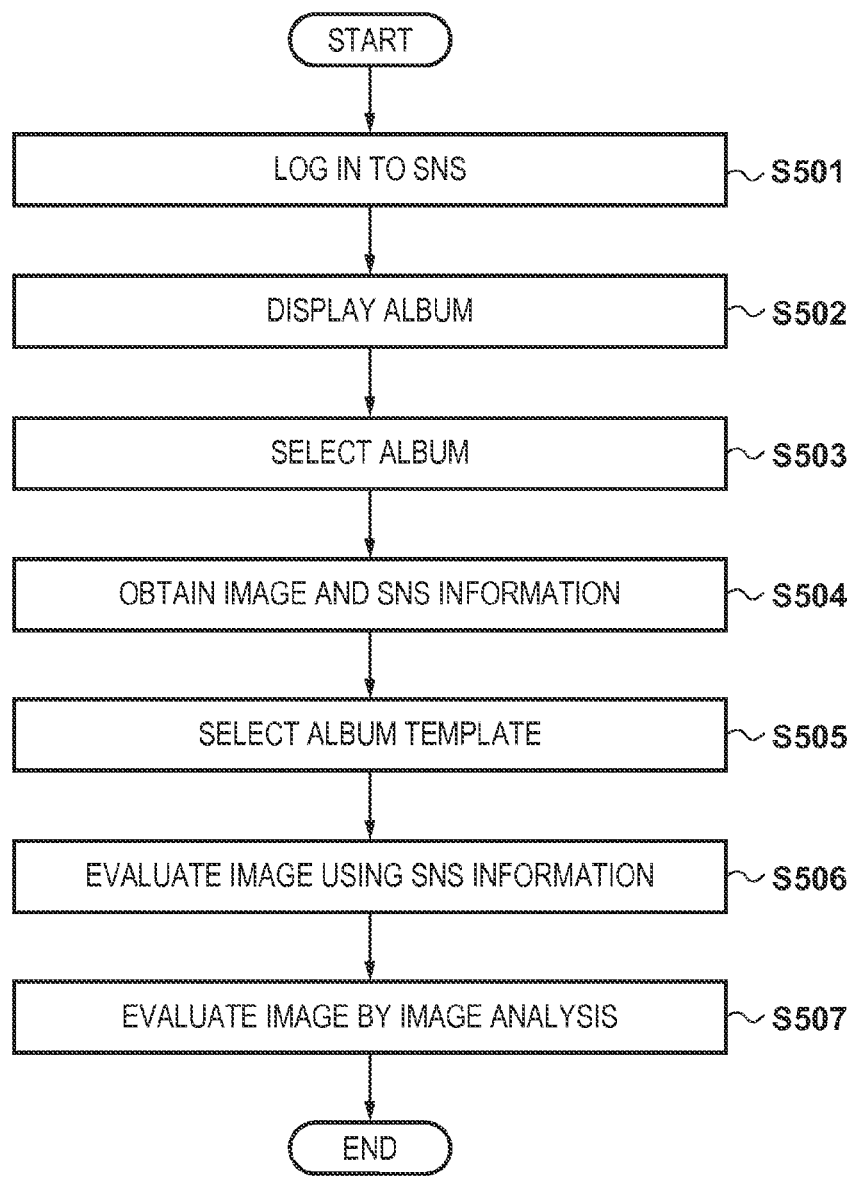
FIG. 7 is a flowchart showing automatic layout creation processing according to the second embodiment.

FIG. 7 is a flowchart showing automatic layout creation processing according to the second embodiment. Like the flowchart of FIG. 3, the processing shown in FIG. 7 is implemented by a CPU 100.

In step S501, the CPU 100 activates a print application on the OS of an information processing apparatus 115 in accordance with a user instruction, and logs in to the SNS.

Figure 8:
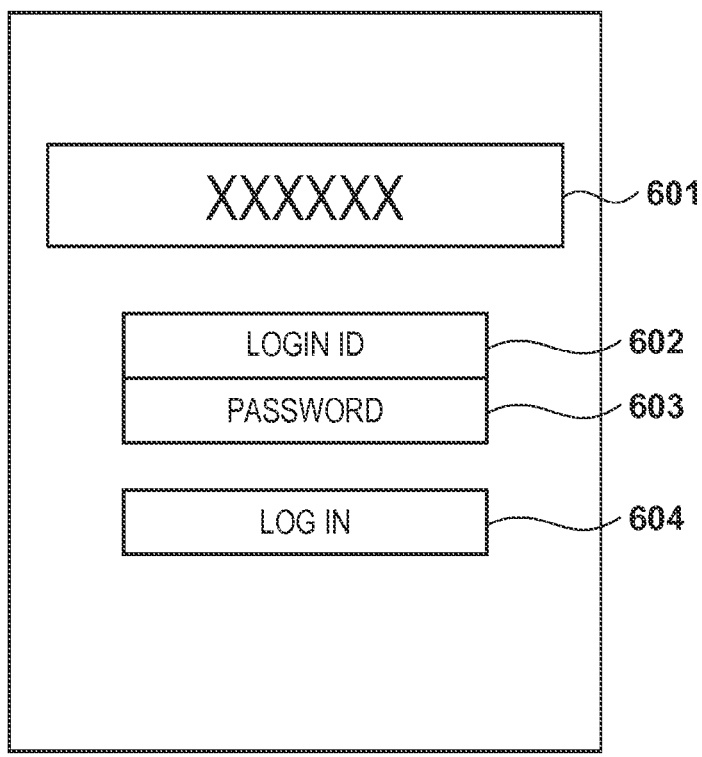
FIG. 8 is a view showing an example of a login screen.

FIG. 8 is a view showing an example of a login screen. As shown in FIG. 8, the screen displays a logo 601 of the SNS provider, and the like. The user inputs an SNS-ID to a field 602 displayed under the logo 601 and an SNS password to a field 603, and presses a login button 604.

In step S502, an album group of each event uploaded on the SNS is displayed in accordance with the pressing.

Figure 9:
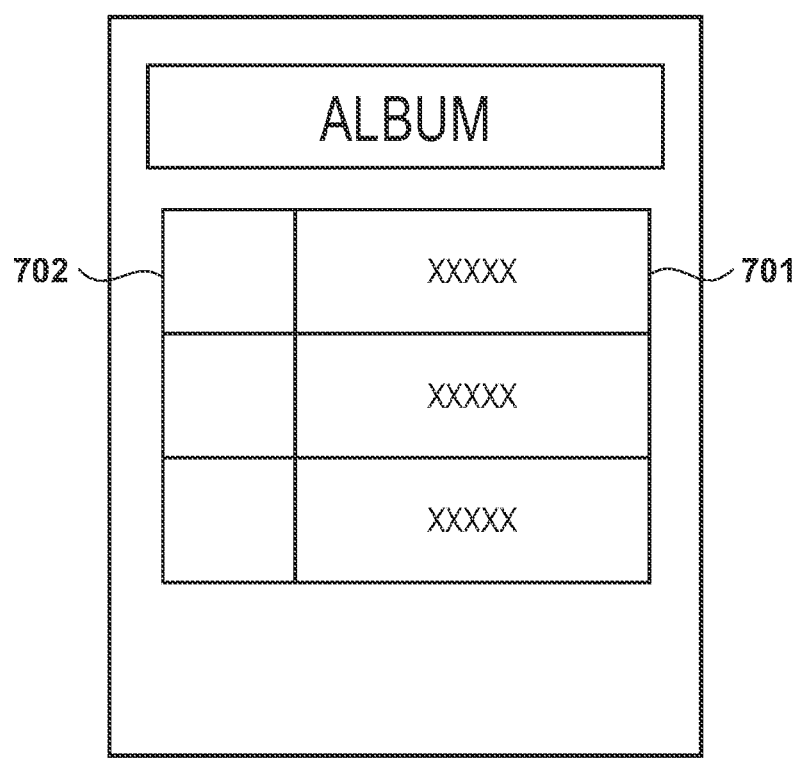
FIG. 9 is a view showing an example of display of an album group.

FIG. 9 is a view showing an example of a display of an album group. An album name 701 and a representative photo 702 of the album are displayed on the screen.

In step S503, the CPU 100 selects a desired event from the album group in accordance with a user instruction.

In step S504, the CPU 100 obtains SNS information of support information ("like"), comment, or share that a person who browsed the image has input for the image together with the image data of the album group. In step S505, the CPU 100 further selects an album template in accordance with a user instruction. Various templates are prepared in advance concerning the number and positions of image frames of each page and the pattern and color of the background.

Figure 10:
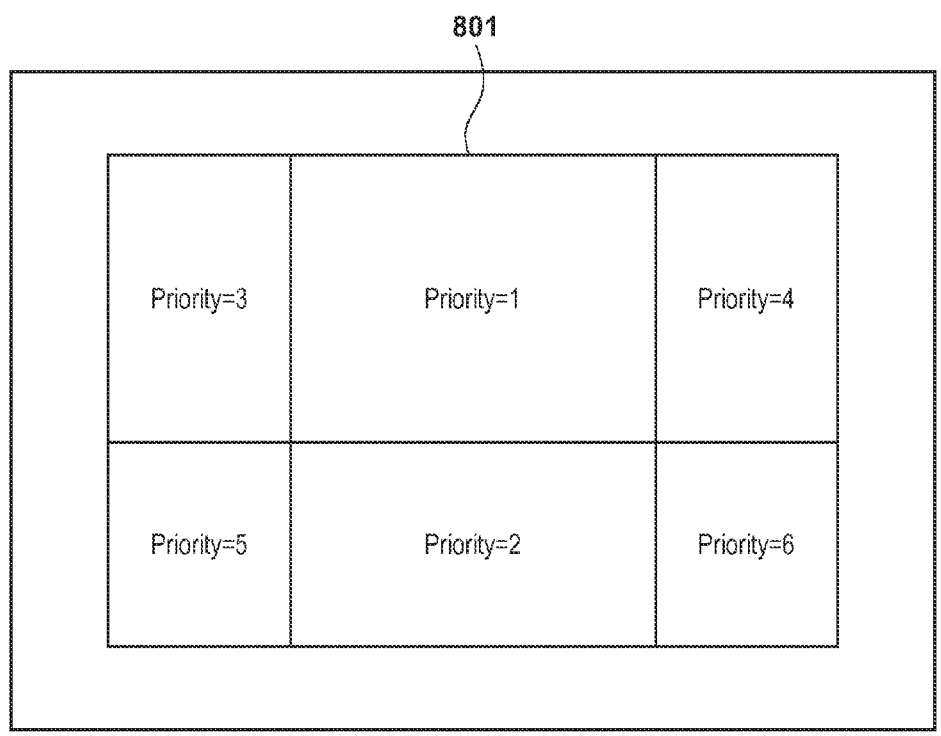
FIG. 10 is a view showing an example of a template.
Figure 11:
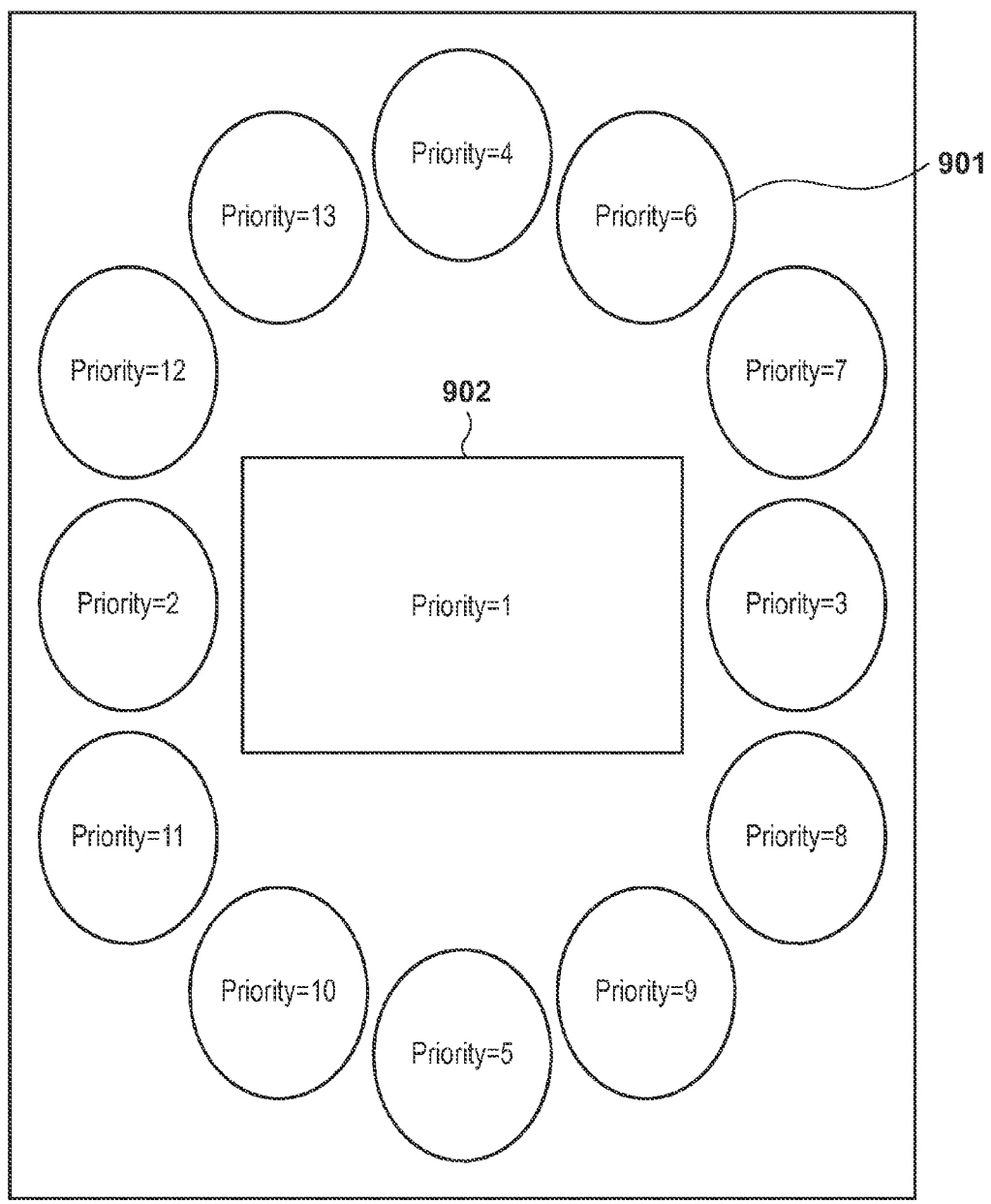
FIG. 11 is a view showing another example of a template.

FIGS. 10 and 11 are views showing examples of templates. In the template shown in FIG. 10, an image is arranged in a rectangular frame 801. In the template shown in FIG. 11, an image is arranged in a rectangular frame 902 or an elliptic frame 901. The priority order of a frame is defined for each image frame based on its size and position. The priority order is represented by a numerical value of Priority shown in FIGS. 10 and 11.

In step S506, each image is evaluated using SNS information associated with each image obtained in step S504. Evaluation is done using weighting as shown in Table 1.

TABLE 1

| Evaluation item (SNS information) | Basic point | Total score |
| --- | --- | --- |
| Like | point 1 | point 1 × number |
| Comment | point 5 | point 5 × number |
| Share | point 10 | point 10 × number |

In step S507, each image is evaluated by image analysis. As the evaluation of image analysis, contents and points as shown in Table 2 are defined.

TABLE 2

| Evaluation item | Basic point | Total score |
| --- | --- | --- |
| average brightness value of face is included in predetermined range | point 1 | point 1 × number of faces |
| sharpness of face region is included in predetermined range | point 1 | point 1 × number of faces |

A final evaluation value Efin is calculated based on the evaluation values. The application arranges the images in the image frames of the template in descending order of evaluation values.

The layout after automatic arrangement is displayed on the UI of the information processing apparatus 115. The user may manually change and resize the images as needed.

The image data after layout creation undergoes setting of a paper type, quality, and the like, by the user and is then input to a printer 112. After rendering processing to a predetermined resolution and predetermined color conversion processing are applied in the printer, the image data is printed by the printer engine.

Hence, according to the above-described embodiment, it is possible to automatically create an album layout from a photo group of an event desired by the user using an application based on information obtained from the SNS.

Note that the values such as points in the above embodiment are values for the descriptive convenience, and any other points and arithmetic expressions are usable as long as they serve the purpose of the present invention.

Third Embodiment

Figure 12:
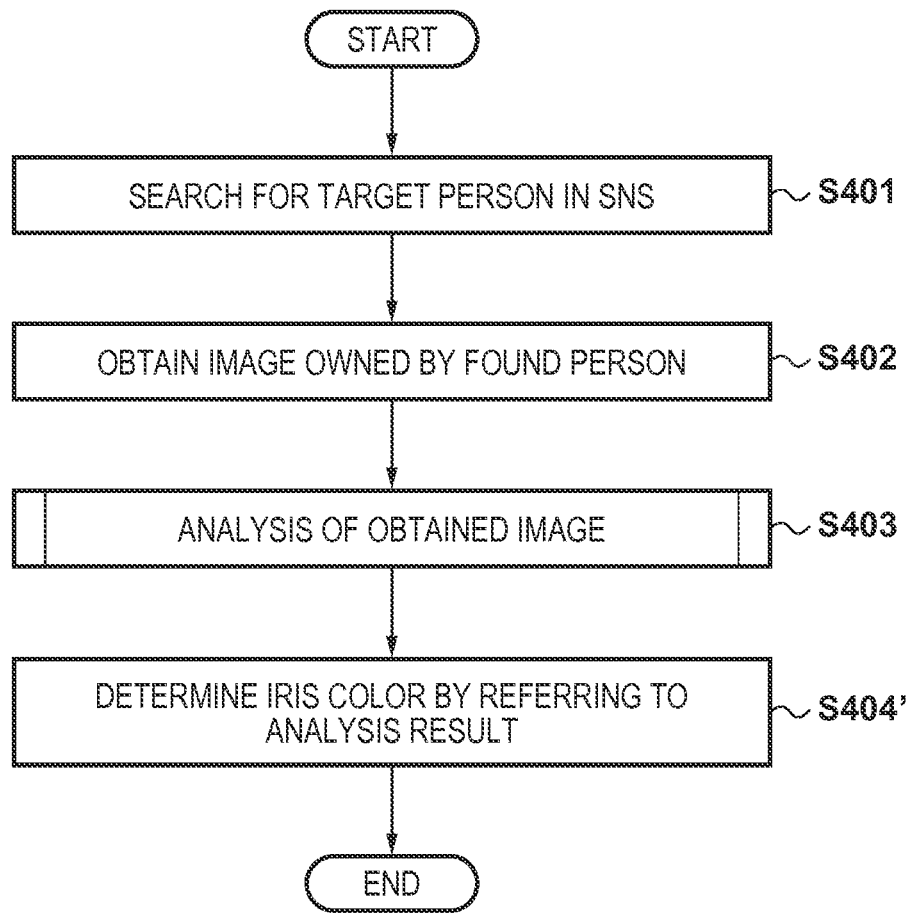
FIG. 12 is a flowchart showing the outline of print processing according to the third embodiment.
Figure 13:
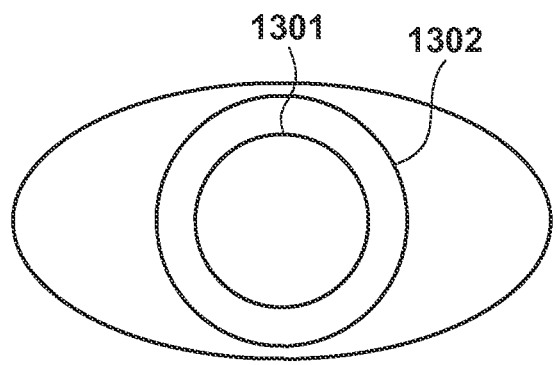
FIG. 13 is a view for explaining the outline of red eye region correction.

FIGS. 12 and 13

In the first embodiment, an example in which the skin color of a person is more accurately corrected using SNS information has been described. The same concept is also applicable to, for example, red eye correction. That is, if correct tag information of a person on the SNS can be used, the iris color of the pupil of the person can correctly be estimated. Red eye is a phenomenon in which a pupil portion inside the iris of a pupil shines in red because of flash light that enters the pupil portion and is reflected by the retina at the back of the eye. According to a known red eye correction algorithm (for example, Japanese Patent Laid-Open No. 2006-350557), when detecting and correcting a red eye region, the region is corrected to black by lowering the luminance and chroma of the red pupil region. However, this is insufficient for red eye correction, and the iris portion needs to be reproduced after the luminance and chroma of the pupil are lowered.

Considering the above problem, an example will be described here in which the iris color of a person of interest is correctly specified from tag information of the SNS, and red eye correction is executed using the specified color.

FIG. 12 is a flowchart showing the outline of print processing according to the third embodiment. Note that, as is apparent from a comparison of FIGS. 12 and 4, FIG. 12 includes processes common to those described with reference to FIG. 4. The same step numbers denote the same processing steps, and a description thereof will be omitted. Only processing steps unique to this embodiment will be described.

In step S404', a print content evaluation unit 205 obtains iris information of a pupil in a photo based on image information including a person included in a print target image obtained from the SNS by a print content obtaining unit 203. As for an iris color obtaining method, the iris color can be obtained using a known pupil extraction algorithm (for example, Japanese Patent Laid-Open No. 2010-20594), and a description thereof will be omitted. As in the first embodiment, the iris color obtained in the above-described way is set as Y0Cb0Cr0 values as target values.

If the pupil of the person of interest included in the print target image is in the red eye state, red eye correction processing is executed based on a user instruction or automatic determination of the application.

Red eye region detection is done in accordance with, for example, a method described in Japanese Patent Laid-Open No. 2006-350557 described above.

Correction of the detected red eye region is executed in the following way.

FIG. 13 is a view for explaining the outline of red eye region correction.

As shown in FIG. 13, an inner concentric circle 1301 and an outer concentric circle 1302 are set for the red eye region. The internal region of the inner concentric circle 1301 is corrected so as to lower the luminance and chroma as before. The region inside the outer concentric circle 1302 and outside of the inner concentric circle 1301 is corrected using the obtained Y0Cb0Cr0 values.

Hence, according to the above-described embodiment, it is possible to implement more desirable red eye correction that reproduces the iris color of the person of interest.

Note that, in this embodiment as well, processing of next time can be speeded up by saving estimated iris color information in a database together with a personal ID.

Fourth Embodiment

FIGS. 14 to 17

In the present invention, when obtaining information other than a print content from an SNS, the information need not directly be bound to the print target image. In all of the above-described embodiments, tag information bound to the print target image or support information and comment information by a third party are used. However, the present invention is not limited to this. Here, an example in which the page layout of a print product is controlled by obtaining information about the age of the user from the SNS will be described.

Some image forming apparatuses, such as a digital multifunctional peripheral and a printer, have an N-UP printing mode in which the images of a plurality of pages are formed on one paper sheet. Considering the load on the environment, it is recently not uncommon to set, by default, a 2-UP printing mode in which the images of two pages are formed on one paper sheet. However, when N-UP printing is performed, characters included in an image may be unreadable because of their small size and details lost depending on the image.

In this case, it is necessary to change the page layout and to perform reprinting. To solve this problem, there exists a technique of calculating the character size in an original image before printing and controlling N-UP printing mode in accordance with the result. For example, Japanese Patent Laid-Open No. 2003-134323 discloses an arrangement that recognizes the character size in an original image and calculates the character size in N-UP printing. The calculation result is compared with a preset minimum character size, thereby determining whether to execute N-UP printing. Japanese Patent Laid-Open No. 2005-217859 proposes a technique of separating a print target image into image information and text information, and determining readability of each information to control the number N of pages in N-UP printing. On the other hand, human eyesight changes in accordance with age. Hence, even in the same original, the readability criteria need to be changed in accordance with the user's age. In both of the above-described known techniques, however, the readability index does not comply with the age. This means that it is difficult to attain image comprehension suitable for each user only by image analysis using an image itself.

Considering the above problem, information about the user's age is obtained from the SNS and used, thereby executing N-UP printing control considering the user's age.

Figure 14:
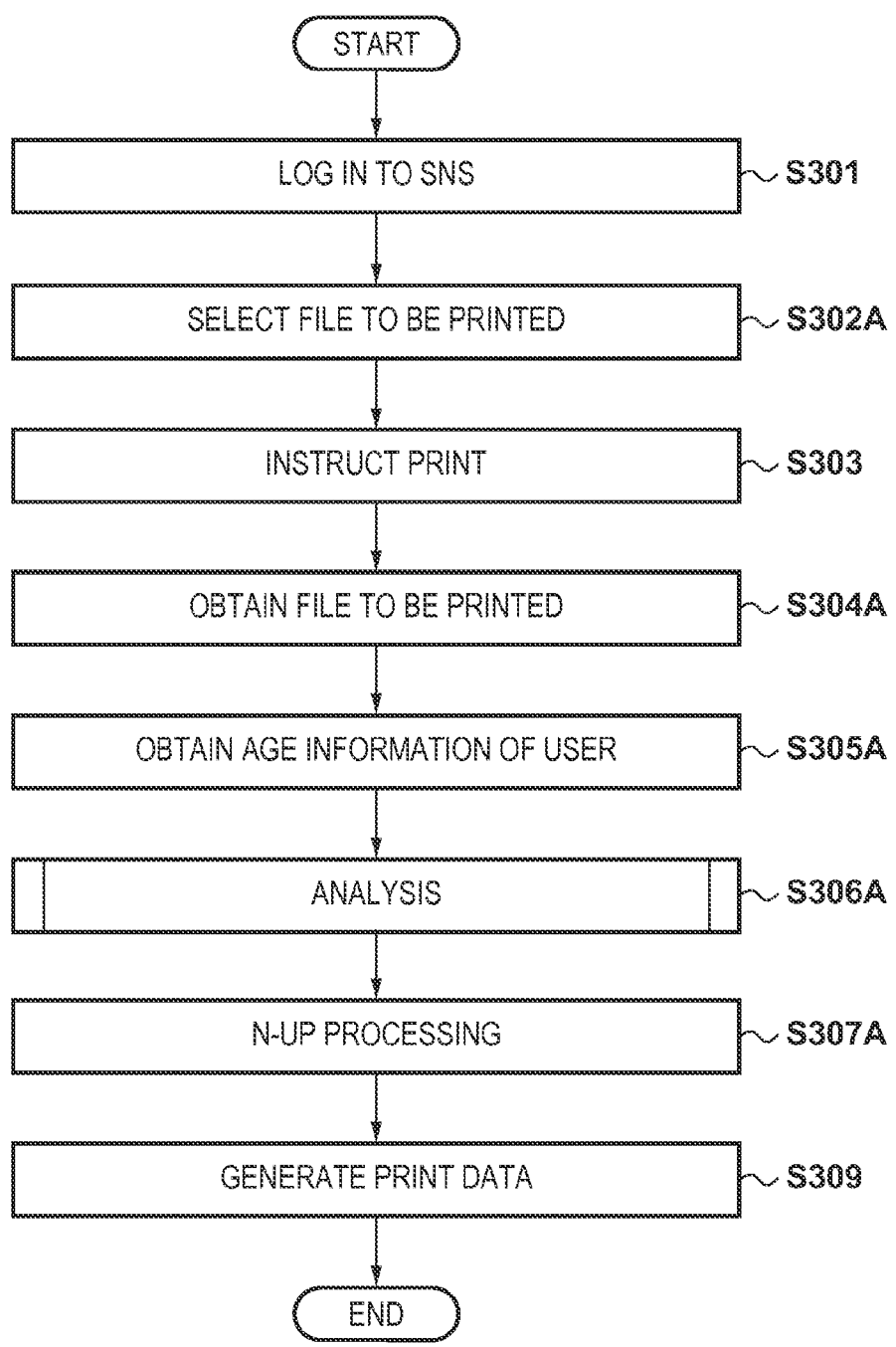
FIG. 14 is a flowchart showing the outline of print data generation processing according to the fourth embodiment.

FIG. 14 is a flowchart showing the outline of print data generation processing according to the fourth embodiment. Note that the same step numbers as those described in the first embodiment with reference to FIG. 3 denote the same processing steps in FIG. 14, and a description thereof will be omitted.

After step S301, a file to be printed is selected in step S302A. The file can be an image file such as a photo, a text file, or a file in which raster data and vector data in a document/image editing application-specific format coexist.

In step S303, a CPU 100 instructs operation to print the selected file in accordance with a user instruction. The user instructs desired N-UP printing. For the N-UP print instruction, the user may designate the value N, or the maximum value of N may automatically be calculated within a readable range by an instruction. If a user instruction is not particularly input, default setting is used.

Here, the processing progresses assuming that N≥2 is designated by the user instruction or default setting. The print instruction may also include the type of paper to be used, quality, and color setting. They can be set from an ordinary printer driver. Alternatively, these settings may automatically be done using, for example, a paper type detection sensor (not shown).

In step S304A, a print content obtaining unit 203 obtains print target file data based on a print job generated in step S303. The file data is saved in a secondary storage device 103 or a server 114.

In step S305A, an SNS information obtaining unit 204 obtains information about the user's age. The information can be either an age or information of the user's date of birth. If the information is date-of-birth information, the user's age is calculated using the date-of-birth information.

In step S306A, a print content evaluation unit 205 analyzes the print target file in consideration of the user's age.

Figure 15:
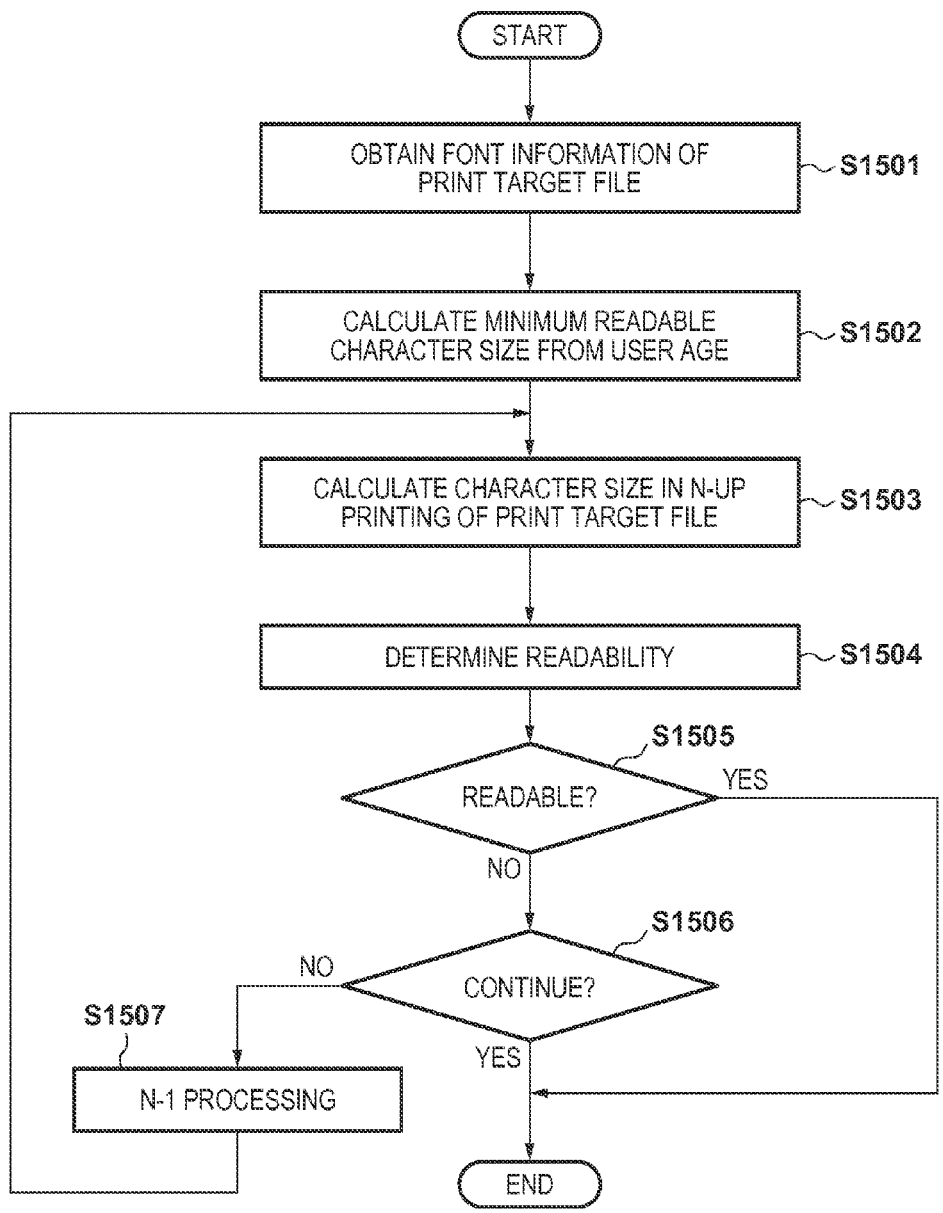
FIG. 15 is a flowchart showing details of analysis processing.

FIG. 15 is a flowchart showing details of analysis processing.

The analysis will be described here with reference to FIG. 15.

In step S1501, the print content evaluation unit 205 obtains font information of the print target file. The font information includes all pieces of ornament information such as a font style, font size, font color, bold or not, italic or not, and presence/absence of underline and shading. The font information can be obtained in accordance with the specification of the file format of the print target file. If the print target file is a photo or scanned image, the font size can be obtained using a known technique such as OCR (Optical Character Recognition), and a detailed description thereof will be omitted. Here, all font sizes (synonymous with character sizes) in the print target file are obtained.

In step S1502, the print content evaluation unit 205 calculates, from the user's age, the minimum readable character size for the user. Any method is usable as the minimum readable character size calculation method. A method to be described below is merely an example. The minimum readable character size calculation method used here is as follows.

According to "JIS S 0032" by the Japanese Industrial Standards Committee, a minimum readable character size Pmin of Japanese characters is given by $$P\text{min} = aS + b$$

where $a$ and b are coefficients determined by a Japanese character type, and S is a size coefficient. The size coefficient S is obtained from the observation environment (the brightness of background of characters in a print product), observation distance, and eyesight in the observation environment and the observation distance. The observation distance is set to 0.5 m in consideration of the average distance in reading a print product. Assuming copy paper generally used in a workplace, or the like, as printing paper to print characters, the observation environment is set to 100 cd/m2. As for the coefficients a and b, a=9.6 and b=3.6 are set assuming 11-stroke to 15-stroke kanji characters in Mincho typeface.

Figure 16:
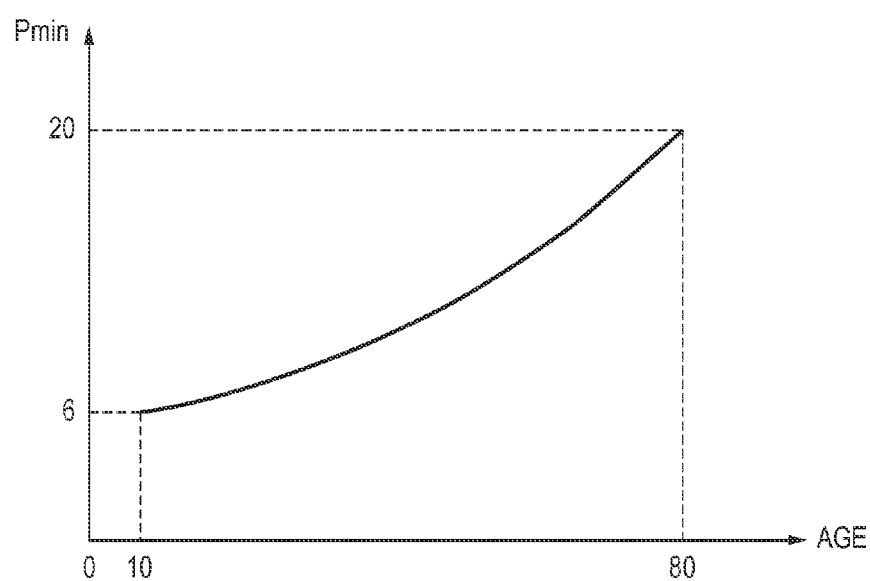
FIG. 16 is a graph showing the relationship between an age and a minimum readable character size.

When ages are reflected on the size coefficient S under this condition, Pmin is represented, as shown in FIG. 16. FIG. 16 is a graph showing the relationship between the age and the minimum readable character size Pmin.

The thus calculated minimum readable character size for each age is held in the form of a 1D LUT. By referring to the 1D LUT, the minimum readable character size according to the user's age is calculated.

In step S1503, the print content evaluation unit 205 calculates the character size in N-UP printing of the print target file. The reduction rate when printing the print target file by N-UP printing is determined by the value N. The character size in N-UP printing can be calculated by multiplying all character sizes obtained in step S1501 by the reduction rate.

In steps S1504 and S1505, the minimum readable character size calculated in step S1502 is compared with the minimum character size in N-UP printing calculated in step S1503, thereby determining the readability. If the minimum character size in N-UP printing is equal to or larger than the minimum readable character size for the user, it is determined that the characters are "readable". Otherwise, it is determined that the characters are "unreadable". If it is determined that the characters are "unreadable", the print content evaluation unit 205 notifies the user of a warning in step S1506. This is done by displaying a predetermined message on the UI of an information processing apparatus 115. If the user who has confirmed the message does not select continuation of printing, the process advances to step S1507 to decrement the set value N by one, and then returns to step S1503 to determine readability again.

If it is determined in step S1505 that the characters are "readable", or the user selects continuation of printing in step S1506, the analysis processing ends. That is, the process of step S306A ends.

Referring back to FIG. 14, in step S307A, the print content evaluation unit 205 performs N-UP processing based on the result of step S306A. After that, in step S309, print data of a predetermined format to be transmitted to a printer 112 is generated.

Note that in the above example, a case when N≥2 is designated in N-UP printing by the user instruction or default setting has been described.

However, the present invention is not limited to this, and the maximum value of N may automatically be calculated within a readable range by an instruction. In this case, analysis processing of step S306A is executed in the following way.

Figure 17:
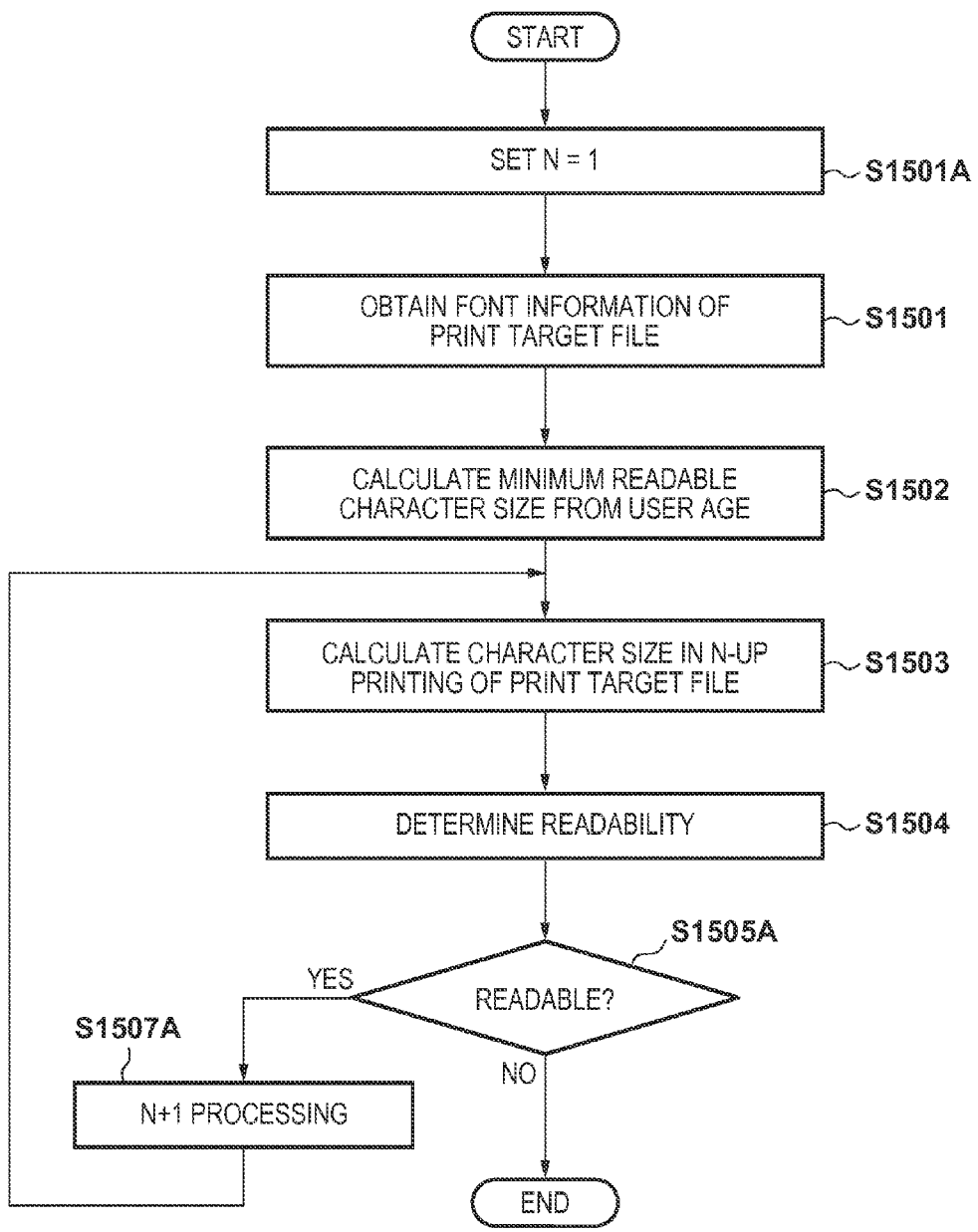
FIG. 17 is a flowchart showing a modification of analysis processing.

FIG. 17 is a flowchart showing a modification of analysis processing. Note that the same step numbers as those described with reference to FIG. 15 denote the same processing steps in FIG. 17, and a description thereof will be omitted. As is apparent from a comparison of FIGS. 17 and 15, processes except steps S1501A, S1505A, and S1507A are the same as those shown in FIG. 15.

In step S1501A, N=1 is set. Processes of steps S1501 to S1504 are performed, and it is determined in step S1505A that the characters are "readable", the process advances to step S1507A to increment the value N by one, and then returns to step S1503 to repeat the readability determination. In this way, the value N is incremented until the determination result changes to "unreadable", thereby automatically calculating the maximum value of N within the readable range.

In the above-described related art, layout processing does not have contents considering the characteristic of each user. Hence, all users are regarded as the same user, and uniform processing is performed for all users.

However, according to the above-described embodiment, image comprehension suitable for each user can be attained by obtaining information about a characteristic of each user, such as the age from the SNS. This enables page layout processing suitable for each user.

Note that the arithmetic expressions and values used in the above description are merely examples for descriptive convenience, and any other arithmetic expressions and values are usable as long as they serve the purpose of the embodiment.

Fifth Embodiment

FIG. 18

In the above-described embodiments, an example in which when generating print data using a print content evaluation result using SNS information, the print content is directly handled by, for example, print target image correction or layout generation has been described. However, the present invention is not limited to this. An example in which an appropriate number of printed copies is automatically set using tag information of a person included in a print content will be described here.

In an image forming apparatus such as a digital multifunctional peripheral or a printer, the number of printed copies is manually set by the user at the time of printing. However, for example, when printing a copy of a group photograph including a plurality of persons for each person to share the photo, it is necessary to count the number of persons included in the photo and to manually set the number of copies. The larger the number of persons included in the photo is, the more burdensome the work is, and the higher the possibility of count error is. When printing a plurality of images at once, counting the number of persons included in each image and manually setting the number of copies for each image take a lot of time and effort. To solve this problem, there exists a technique of detecting faces in an image and determining the number of printed copies using the number of detected faces (for example, Japanese Patent Laid-Open No. 2003-219329).

However, if the number of printed copies is set based on the number of detected faces, for example, an unrelated person, such as a passer-by included in the image, may also be counted, and copies of print products more than necessary may be output.

Considering the above problem, the number of printed copies is determined by obtaining and using tag information added to an image on an SNS.

Figure 18:
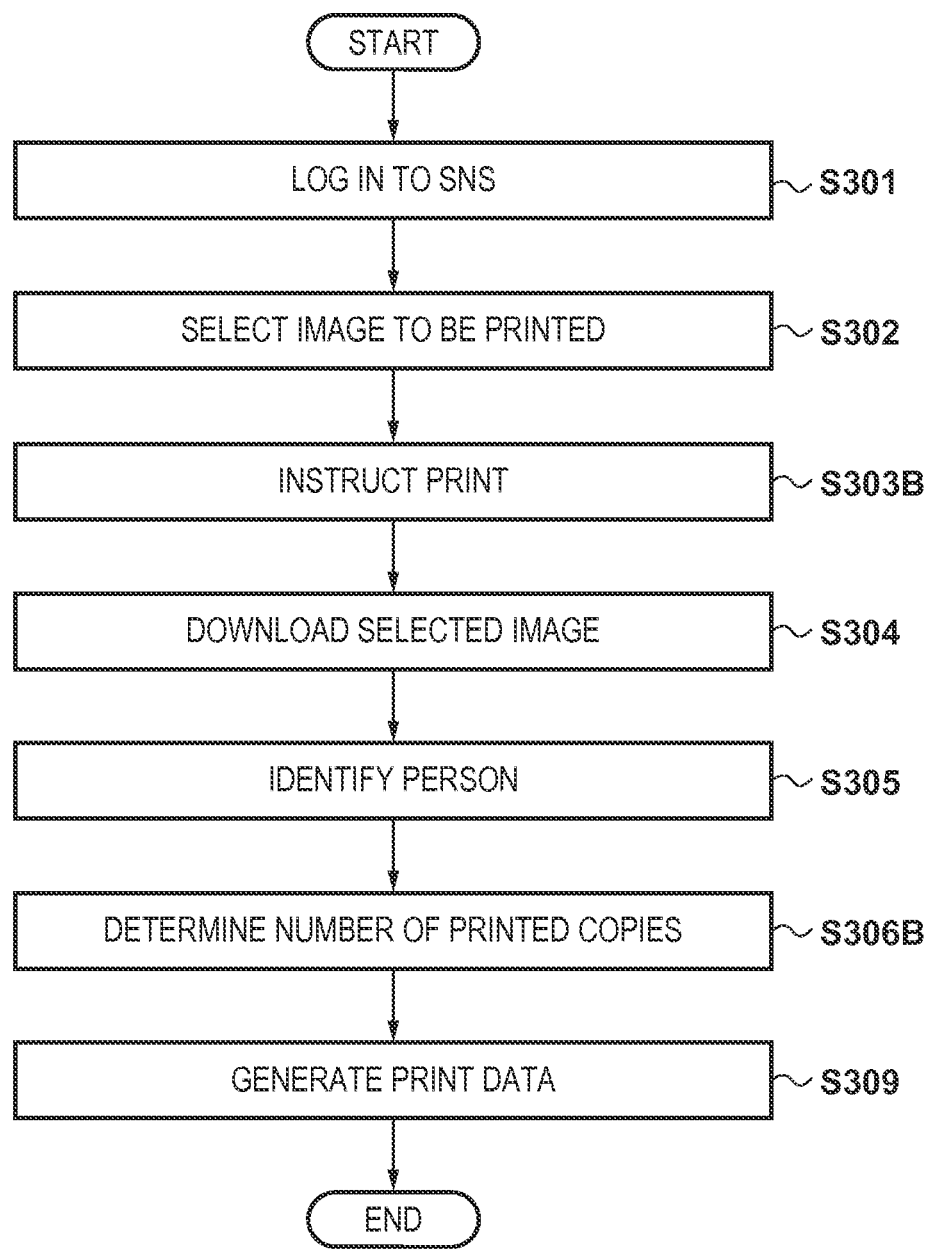
FIG. 18 is a flowchart showing the outline of print data generation processing according to the fifth embodiment.

FIG. 18 is a flowchart showing the outline of print data generation processing according to the fifth embodiment. Note that the same step numbers as those described in the first embodiment with reference to FIG. 3 denote the same processing steps in FIG. 18, and a description thereof will be omitted. As is apparent from a comparison of FIGS. 18 and 3, characteristic processes of this embodiment are steps S303B and S306B.

In the print instruction of step S303B, the user does not explicitly decide the number of printed copies. An assumable case is, for example, a case when setting of the number of printed copies is automatically controlled or a case when the user designates a mode to print copies as many as the number of persons included in each image.

In step S306B, the number of printed copies is determined based on the number of persons identified in step S305.

In this embodiment, the number of printed copies is determined based on the number of persons identified in each image. This makes it possible to perform more accurate processing as compared to a case when the number of printed copies is determined simply based on the number of detected faces. As described above, tagging of person positions is done on the SNS not by a known personal recognition algorithm, but by much labor including third parties. In personal identification by the known personal recognition algorithm, a recognition error occurs at a probability of several tens of percentages. In particular, in a case when a face in profile or a face with a mask is detectable, but personal identification is difficult, or in a case when detection itself is difficult because of a partially invisible face or a disguise to a thing completely different from a human face, it is difficult to perform reliable identification by an algorithm. On the other hand, since the above-described tagging is done manually, correction information can be obtained at a high possibility as compared to recognition by an algorithm.

Hence, according to the above-described embodiment, it is possible to determine an appropriate number of printed copies using correct tag information as described above and print copies in accordance with it.

Note that, in this embodiment, an example in which the number of printed copies is determined by obtaining, from the SNS, person tag information added to an image has been described. However, the present invention is not limited to this. For example, when printing a material associated with an event or a photo album associated with an event and distributing copies to all participants of the event, the number of printed copies may be determined by obtaining information of persons participating in the event from event information on the SNS.

Any other method can be employed as long as it serves the purpose of the embodiment.

Sixth Embodiment

FIGS. 19 to 22

In the second embodiment, an example, in which when automatically creating an album layout, evaluation information of a third party on an SNS is used has been described. Additionally, in the second embodiment, the advantage of making an image, which is hard to select only by image analysis, usable in a layout by using subjective evaluation of a human has been described. Furthermore, the advantage of allowing an excellent layout from being created using evaluation information of a third party on the SNS without making the user evaluate all of an enormous number of images by himself/herself has been described.

In the second embodiment, however, the basic point of each item in evaluation using SNS information is uniform regardless of the person who makes the evaluation. Hence, in this method, regardless of the user who executes automatic layout generation processing, the same layout is created from the same layout creation target images, irrespective of the intention of each user.

On the SNS, an image or an album uploaded by a certain user can be browsed or shared by other users. For this reason, occasions when a plurality of different users execute automatic album layout creation for the same photo group may often occur. However, the relationship between a user who has made subjective evaluation of each image and a user who performs layout creation is not always the same. Hence, evaluation of a certain image may be done by a friend of the user who performs layout creation or a stranger. Alternatively, the user himself/herself who executes layout creation may do the image evaluation. In general, images considered to be desirable change depending on the person or human relationship. For the above-described reasons, in some cases, an appropriate layout can be created by emphasizing evaluation by the user himself/herself who executes layout creation or evaluation by the personal friend of the user.

For example, assume that an image A has ninety-eight "like" evaluation tags by SNS users other than the user himself/herself and one "like" tag by the user himself/herself, that is, a total of ninety-nine "like" tags. On the other hand, an image B is assumed to have one hundred "like" tags by SNS users other than the user himself/herself and zero "like" tag by the user himself/herself, that is, a total of one hundred "like" tags. If the basic point of one "like" is uniformly set to 1, the total score of the image A is ninety-nine, and that of the image B is one hundred. As a result, the image B has a higher score from the viewpoint of image evaluation "like" and is used in a layout at a high possibility. Although the difference in score is only one, the possibility of use in a layout is higher in the image B without "like" added than the image A with the "like" added by the user himself/herself. That is, in the above-described example, evaluation can appropriately be done by evaluating the images in consideration of not only the total number of "like" tags but also the users who have added them.

In this embodiment, an example in which the weight of the basic point is changed in accordance with the person who has made image evaluation will be described. More specifically, an example in which the basic point of "like" is changed in accordance with the person who has added the "like" will be described. This makes it possible to change a layout output result in accordance with the user who creates a layout. It is also possible to create a layout by taking advantage of evaluation by the user himself/herself while using evaluation by other SNS users.

The basic arrangement of this embodiment is the same as that in the second embodiment, and only an arrangement and processing characteristic to this embodiment will be described. More specifically, concerning steps S504 and S506 shown in FIG. 7, characteristic processes of this embodiment will be described.

In step S504, an SNS information obtaining unit 204 obtains, together with the personal ID information of the login user, the friend list information of the login user, and the personal ID information of persons who input "like" to the image together with the image data of a target album group. The friend list information is a list of personal ID information of other users who have a friend relationship with the login user in the SNS.

In step S506, a print content evaluation unit 205 evaluates each image using SNS information associated with each image obtained in step S504. A detailed procedure will be described below.

First, concerning "like" tags of all images, the personal IDs of persons who input "like", the personal ID of the login user, and the personal IDs of friends are checked. The "like" tags added to each image are classified into "like" added by the login user, "like" added by friends of the login user, and "like" added by other users. Next, all SNS users who made evaluation of the images in the target album are classified into three types, that is, the login user, friends of the login user, and other users, and the number of persons of each type is obtained. After that, the basic point of "like" is calculated for each category in accordance with the number of persons. Finally, the total score of "like" of each image is calculated based on the classification result of each "like" added to each image and the basic point of "like" for each category.

Processing from image evaluation by image analysis of step S507 is the same as that in the second embodiment. Note that the personal ID information of the login user may be obtained at the time of login in step S501.

The above-described processing of calculating the basic point of "like" and a state in which the output result is changed by changing the basic point will be described next in more detail using a specific example.

For example, consider a case when two images to be used in a layout are selected from six images (image a, image b, image c, image d, image e, and image f) on the SNS. For easy understanding of the effect, assume that the images to be selected are determined using only an evaluation result by "like". The six images have "like" added by some of 10 users (user A, user B, user C, user D, user E, user F, user G, user H, user I, and user J).

FIG. 19 is a view showing a list representing which user has added "like" to which image. Referring to FIG. 19, "○" indicates that the user has added "like", and "-" indicates that the user has not added "like". The lowermost column of FIG. 19 shows the total number of "like" tags. Assume a case when the users A and B log in to their accounts on the SNS and execute automatic album layout creation.

Figures 20A, 20B:
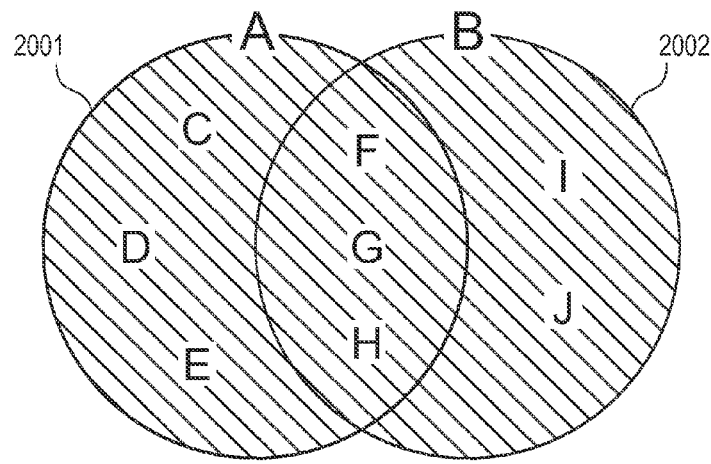
FIGS. 20A and 20B are views showing the human relationship between users A and B, and other users.

FIGS. 20A and 20B are views showing the human relationship among the users A and B, and other users.

FIG. 20A shows a state in which users included in a circle 2001 are friends of the user A, and users (to be referred to as strangers here) outside of the circle have no friend relationship with the user A. Similarly, a circle 2002 represents the range of friends of the user B. FIG. 20B is a table showing what kind of relationship exists between the users A and B, and other users. As is apparent from FIGS. 20A and 20B, the users A and B are strangers from each other, but there exist users who have a friend relationship with both the users A and B. They are users F, G, and H.

An example in which each of the users A and B creates a layout will be described by exemplifying the above-described human relationship.

FIG. 21 is a view showing a table of basic points in four cases (Cases 1 to 4). FIG. 22 is a view showing a table of total scores in four cases (Cases 1 to 4) shown in FIG. 21.

[1] Case 1 (a Case when Only Evaluation of the User Himself/Herself is Reflected)

For the sake of comparison, assume a case when only "like" by the user himself/herself who creates an album layout is reflected. This is substantially equivalent to a case when image evaluation information by a third party on the SNS is not used. That is, this is the same as a related art (for example, Japanese Patent Laid-Open No. 2006-120076) in which a user himself/herself sets "favorite" for each image on a local application, or the like.

The basic point of "like" is one for the user himself/herself and zero for others, as shown in the rows of Case 1 of FIG. 21. As a result, the total score of "like" of each image and selected images (=output result) as shown in the rows of Case 1 of FIG. 22 are obtained. Only images with "like" added by the user himself/herself are selected in both a case when the user A creates a layout and a case when the user B creates a layout. It should be noted that the image b or d with the smallest number of "like" tags is selected, and the image e with the largest number of "like" tags is not selected, as can be seen from FIG. 19.

As described above, the image having many "like" tags, that is, the image that is potentially good (when evaluated by a third party) cannot be used in a layout. The possibility that the users A and B have not browsed the images e and f to begin with, or have browsed but forgotten to add "like" is also sufficiently considerable. However, when evaluation of the user himself/herself is used, it is impossible to cope with these situations.

[2] Case 2 (a Case when Evaluations of all Users are Reflected, and No Weight is Added to Basic Points)

Assume a case when "like" of all of the ten users is reflected, and no weight is added to the basic points. This is equivalent to the example of the second embodiment. The basic point of "like" is uniformly set to 1, as shown in the rows of Case 2 of FIG. 21. As a result, the total score of "like" of each image and the output result as shown in the rows of Case 2 of FIG. 22 are obtained. Two images (images e and f) are selected in descending order of total number of "like" tags in both a case when the user A creates a layout and a case when the user B creates a layout. It should be noted that the images a and c with "like" added by the user himself/herself are not selected, and the image f without "like" added by the user himself/herself is selected. In addition, the difference in total number of "like" tags between the image f and the images a and c is merely 1.

As described above, the images with "like" added by the user himself/herself are not selected, and the image without "like" is selected, although the total numbers of "like" tags almost equal. Such a situation may occur if no weight is added to the basic points.

[3] Case 3 (a Case when Evaluations of all Users are Reflected, and a Weight is Added to the Basic Point of Evaluation of the User Himself/Herself)

Assume a case when "like" of all of the ten users is reflected, and a weight is added to the basic point of "like" by the user himself/herself. No distinction between friends and strangers is made, and they are uniformly defined as "other users".

The basic points are calculated in the following way. Consider the balance between the score of "like" by the user himself/herself and the total score of "like" of all other users. In this example, the total number of users is ten. Nine other users exist relative to one user himself/herself. When the basic point of "like" by other users is one, the total score of "like" of all other users is nine. On the other hand, how to set the score of "like" of the user himself/herself is considered. For example, consider setting the basic point of "like" of the user himself/herself to 50% of the total score of "like" of all other users, that is, 4.5.

With this setting, the evaluation of the user himself/herself may be reflected too strongly due to the following reason. In the example shown in FIG. 19, a total of twenty-one "like" tags are added to the six images, as can be seen. In this evaluation, both the users A and B have added two "like" tags by himself/herself. In either case, the total number of "like" tags added by other users is nineteen, and the average number of "like" tags per image by other users is about 3.1, as is apparent.

In a case when the basic point of "like" by other users is 1, the average score of "like" per image by other users is 3.1. Hence, the score of 4.5 is much higher than this value. The objective of this embodiment is to create a layout by taking advantage of both evaluation by the user himself/herself and evaluation by other users. Hence, the basic point of "like" of the user himself/herself is set to be smaller than the average score per image by "like" of other users, that is, 3.1.

In this embodiment, the basic point of "like" of the user himself/herself is determined to satisfy a relationship given by the following expression. That is:

score of "like" of user himself/herself:score of "like" of all other users=1:3 is set.

Accordingly, the basic point of "like" of the user himself/herself is 3, and the basic point of "like" of other users is 1, as shown in the rows of Case 3 of FIG. 21. As a result, the total score of "like" of each image and the output result as shown in the rows of Case 3 of FIG. 22 are obtained. That is, the images a and e are selected in a case when the user A creates a layout, and the images c and e are selected in a case when the user B creates a layout. The image a has both "like" added by the user A and "like" added by the plurality of other users. The image c has both "like" added by the user B and "like" added by the plurality of other users. The image e has the largest number of "like" tags added by other users but no "like" added by the user himself/herself.

As described above, a weight is added to the basic point of evaluation of the user himself/herself, thereby obtaining a result on which both evaluation by the user himself/herself and evaluation by other users are reflected.

[4] Case 4 (a Case when Evaluations of all Users are Reflected, and Weights are Added to Both the Basic Point of Evaluation of the User Himself/Herself and the Basic Point of Evaluation of Friends)

In Case 3, the image e is selected in both a case when the user A creates a layout and a case where the user B creates a layout. The image e does not have "like" added by the users A and B. According to Case 3, when selecting an image without "like" added by the user himself/herself, the same image is selected always. This means that when automatically generating an album layout from a certain image group, the same layout is always generated for users who have not added "like" to the image group.

Examine the meaning that an image without "like" added by the user himself/herself has for the user.

According to Case 3 of FIG. 22, in both a case when the user A creates a layout and a case when the user B creates a layout, the image having the highest score is the image e, and the image having the second highest score is the image f. Comparatively, examine the meaning of the images e and f for the users A and B.

For the user A, the image e is an image with "like" added by six friends, and the image f is an image with "like" added by three friends and two strangers. It is believed that the image e reasonably attains a high score because all users who have added "like" are friends, and the total number of "like" tags is large. On the other hand, for the user B, the image e is an image with "like" added by three friends and three strangers, and the image f is an image with "like" added by five friends. Although the total number of "like" tags is large, half of the users who have added "like" are strangers for the user B. On the other hand, the total number of "like" tags of the image f is smaller than that of the image e by one, but all the users who have added "like" are friends of the user B.

Assume that each user adds "like" to an image including himself/herself. For the user B, the image e is an image including three friends and three strangers, and the image f is an image including five friends. In this case, the image f including more friends can be considered to be suitable for the album layout to be created by the user B. This indicates that it is problematic that the same image is always selected upon using an image without "like" added by the user himself/herself for a layout.

Considering the above problem, in Case 4, "like" of all of the ten users is reflected, and weights are added to the basic point of "like" of the user himself/herself and the basic point of "like" of friends. In Case 4, the basic points are calculated in the following way. The basic concept is the same as in Case 3. Here, however, the basic points are determined to satisfy relationships given by the following expressions. That is:

score of "like" of user himself/herself:score of "like" of all friends=1:3, and score of "like" of all strangers:score of "like" of all friends=1:3 are set.

Accordingly, values shown in the rows of Case 4 of FIG. 21 are obtained as the basic points. In a case when the user A creates a layout, the basic point of "like" of the user himself/herself is three, the basic point of "like" of friends is 1.5, and the basic point of "like" of strangers is one. In a case when the user B creates a layout, the basic point of "like" of the user himself/herself is four, the basic point of "like" of friends is 2.4, and the basic point of "like" of strangers is one. Although detailed calculations will be omitted, the basic point of "like" of the user himself/herself is set to be smaller than the average score per image by "like" of friends and strangers in this case as well.

As a result, the total score of "like" of each image and the output result as shown in the rows of Case 4 of FIG. 22 are obtained. The images a and e are selected in a case when the user A creates a layout, and the images c and f are selected in a case when the user B creates a layout. For the user A, the image a is an image having both "like" added by the user himself/herself and "like" added by a plurality of friends, and the image e is an image having no "like" added by the user himself/herself but "like" added by many friends. For the user B, the image c is an image having both "like" added by the user B himself/herself and "like" added by a plurality of friends, and the image f is an image having no "like" added by the user himself/herself but "like" added by many friends.

As described above, evaluations of all users are reflected, and weights are added to both the basic point of evaluation of the user himself/herself and the basic point of evaluation of friends, thereby obtaining a result on which both evaluation by the user himself/herself and evaluation by other users are reflected while emphasizing evaluation of friends in the evaluation by users other than the user himself/herself.

Hence, according to the above-described embodiment, weights according to the human relationship among the user himself/herself, friends, and strangers are added to the basic points of evaluation, thereby creating an appropriate layout using evaluation of the user himself/herself and other SNS users.

In the above-described embodiment, when the layout creator logs in to the SNS, the layout creator can uniquely be specified on the SNS. In addition, friend information of the layout creator and the personal ID information of persons who have made subjective evaluation ("like") of the layout target image are obtained, thereby identifying the setters of the subjective evaluation. This makes it possible to change, in accordance with the setter, the weight of the subjective evaluation information that is conventionally handled uniformly regardless of who is the setter.

Hence, the output result of automatic layout, which conventionally produces only the same layout result regardless of the user who executes creation, can be changed in accordance with the user who creates the layout. It is also possible to create a layout by taking advantage of evaluation by the user himself/herself while using evaluation by other SNS users.

Note that values such as points in the above embodiment are values for descriptive convenience, and any other points and arithmetic expressions are usable as long as they serve the purpose of the present invention. In this embodiment, the setters of "like" are classified into three types, that is, the user himself/herself, friend, and stranger, and the weights of the basic points are changed. However, the present invention is not limited to this. Any other classification method is also incorporated in the scope of the present invention if the same effect as described above is obtained.

The SNS server according to the above-described embodiments is not limited to a server apparatus. That is, the SNS server may be formed from one server apparatus, or a server system including a plurality of servers may operate as the SNS server. For example, a server apparatus that stores images as print target candidates and provides the images to the information processing apparatus and a server apparatus that stores evaluation information and provides it to the information processing apparatus may be different. A server apparatus that stores images and evaluation information as described above and a server apparatus that provides them to the information processing apparatus may be different.

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or an apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus comprising:
   (a) a download unit configured to download, in accordance with an instruction of a user, a print target image from a server accessible by a third party using an SNS (Social Networking Service) via a network, different from the user;
   (b) a processor configured:
      (i) to obtain subjective evaluation information of the third party for the print target image included in a tag added to the print target image downloaded by said download unit;
      (ii) to evaluate the print target image, based on the subjective evaluation information of the third party, and
      (iii) to perform image processing for the downloaded print target image in accordance with a result of the evaluation; and
   (c) an output unit configured to output image data that has undergone the image processing of said processor,
   wherein:
      (i) said processor further obtains information used to classify the third party who has made an evaluation corresponding to the evaluation information into a friend of the user who has instructed the download and a stranger, and performs the image processing including automatic creation of an album layout using a plurality of downloaded print target images, and selects an image to be included in a template of the album, based on the evaluation information classified into the friend and the stranger by the information obtained by said processor,
      (ii) the user who has instructed the download can be classified by the information obtained by said processor, and
      (iii) said processor weights evaluation of the user, evaluation of the friend, and evaluation of the stranger, and selects the image to be included in the template of the album based on a result of the weighting.

2. The apparatus according to claim 1, wherein said output unit outputs the image data to a printer configured to print the downloaded print target image on a print medium based on the image data.

3. The apparatus according to claim 1, wherein the image processing includes correction processing for the downloaded print target image, and, in a case when the downloaded print target image includes a person, the correction processing includes at least one of skin color correction and red eye correction.

4. The apparatus according to claim 1, wherein the image processing further includes N-UP processing for printing a plurality of downloaded print target images on one print medium.

5. The apparatus according to claim 4, wherein the image processing includes processing of determining a number of images to be printed on one print medium based on an age of the user who has instructed the download.

6. The apparatus according to claim 4, wherein an album template of a predetermined format is provided for the automatic creation of the album layout, and a predetermined number of images is to be included in the album template.

7. An information processing method comprising:
   downloading, in accordance with an instruction of a user, a print target image from a server accessible by a third party using an SNS (Social Networking Service) via a network different from the user;
   obtaining subjective evaluation information of the third party for the downloaded print target image included in a tag added to the downloaded print target image;
   evaluating the downloaded print target image, based on the subjective evaluation information of the third party;
   performing image processing for the downloaded print target image in accordance with a result of the evaluation in the evaluating; and
   outputting image data that has undergone the image processing,
   wherein:
      (i) in the obtaining, information used to classify the third party who has made an evaluation corresponding to the evaluation information into a friend of the user who has instructed the download and a stranger is obtained,
      (ii) in the image processing, automatic creation of an album layout using a plurality of downloaded print target images is included,
      (iii) the user who has instructed the download can be classified by the obtained information,
      (iv) evaluation of the user, evaluation of the friend, and evaluation of the stranger are weighted, and
      (v) an image to be included in a template of the album is selected, based on the weighted evaluation information classified into the user, the friend, and the stranger by the obtained information.

8. The method according to claim 7, wherein, in the outputting, the image data is output to a printer configured to print the print target image on a print medium based on the image data.

9. The method according to claim 7, wherein the image processing includes correction processing for the downloaded print target image, and, in a case when the downloaded print target image includes a person, the correction processing includes at least one of skin color correction and red eye correction.

10. The method according to claim 7, wherein the image processing further includes N-UP processing for printing a plurality of downloaded print target images on one print medium.

11. An information processing method comprising:
   downloading, in accordance with an instruction of a user, a print target image from a server accessible by a third party using an SNS (Social Networking Service) via a network different from the user;
   obtaining subjective evaluation information of the third party for the downloaded print target image included in a tag added to the downloaded print target image;
   evaluating the downloaded print target image, based on the subjective evaluation information of the third party;
   performing image processing for the downloaded print target image in accordance with a result of the evaluation in the evaluating; and
   outputting image data that has undergone the image processing,
   wherein the image processing further includes N-UP processing for printing a plurality of downloaded print target images on one print medium, and the image processing includes processing of determining a number of images to be printed on one print medium based on an age of the user who has instructed the download.

12. The method according to claim 11, wherein the image processing further includes automatic creation of an album layout using the plurality of downloaded print target images.

13. A non-transitory computer readable storage medium that stores a computer program to be executed in a processor of an information processing apparatus, the program comprising:
- downloading, in accordance with an instruction of a user, a print target image from a server accessible by a third party using an SNS (Social Networking Service) via a network different from the user;
- obtaining subjective evaluation information of the third party for the downloaded print target image included in a tag added to the downloaded print target image;
- evaluating the downloaded print target image, based on the subjective evaluation information of the third party;
- performing image processing for the downloaded print target image in accordance with a result of the evaluation in the evaluating; and
- outputting image data that has undergone the image processing, wherein:
(i) in the obtaining, information used to classify the third party who has made an evaluation corresponding to the evaluation information into a friend of the user who has instructed the download and a stranger is obtained,
(ii) in the image processing, automatic creation of an album layout using a plurality of downloaded print target images is included,
(iii) the user who has instructed the download can be classified by the obtained information,
(iv) evaluation of the user, evaluation of the friend, and evaluation of the stranger are weighted, and
(v) an image to be included in a template of the album is selected, based on the weighted evaluation information classified into the user, the friend, and the stranger by the obtained information.

* * * * *